US007925042B2

(12) United States Patent
Kimura et al.

(10) Patent No.: US 7,925,042 B2
(45) Date of Patent: Apr. 12, 2011

(54) INFORMATION PROCESSING APPARATUS AND INFORMATION PROCESSING METHOD

(75) Inventors: Tomohiro Kimura, Tokyo (JP); Mitsuyoshi Suzuki, Tokyo (JP); Hiroshi Ito, Tokyo (JP); Minoru Wada, Tokyo (JP); Ryousuke Fujii, Tokyo (JP); Koichi Magai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 883 days.

(21) Appl. No.: 11/579,873

(22) PCT Filed: Jul. 15, 2004

(86) PCT No.: PCT/JP2004/010130

§ 371 (c)(1), (2), (4) Date: Sep. 10, 2007

(87) PCT Pub. No.: WO2006/008787

PCT Pub. Date: Jan. 26, 2006

(65) Prior Publication Data

US 2008/0285789 A1 Nov. 20, 2008

(51) Int. Cl.
*G06K 9/00* (2006.01)
*H04N 7/167* (2006.01)

(52) U.S. Cl. .......................... 382/100; 382/305; 380/201

(58) Field of Classification Search .................. 382/100, 382/103, 107, 116, 135–140, 168, 181, 189, 382/201, 232, 243, 254, 274, 276, 291, 305, 382/312; 707/5; 380/201; 1/1; 715/708, 715/716

See application file for complete search history.

(56) References Cited

U.S. PATENT DOCUMENTS

| | | | | |
|---|---|---|---|---|
| 6,850,252 | B1 * | 2/2005 | Hoffberg | 715/716 |
| 7,181,438 | B1 * | 2/2007 | Szabo | 1/1 |
| 7,536,034 | B2 * | 5/2009 | Rhoads et al. | 382/107 |
| 7,792,325 | B2 * | 9/2010 | Rhoads et al. | 382/100 |
| 7,831,912 | B2 * | 11/2010 | King et al. | 715/708 |
| 2007/0053513 | A1 * | 3/2007 | Hoffberg | 380/201 |
| 2007/0156677 | A1 * | 7/2007 | Szabo | 707/5 |

FOREIGN PATENT DOCUMENTS

| | | | |
|---|---|---|---|
| JP | 2000-287063 | A | 10/2000 |
| JP | 2001-169090 | A * | 6/2001 |
| JP | 2002-190945 | A | 7/2002 |
| JP | 2003-008869 | A | 1/2003 |
| JP | 2003-110842 | A | 4/2003 |

* cited by examiner

*Primary Examiner* — Seyed Azarian
(74) *Attorney, Agent, or Firm* — Birch, Stewart, Kolasch & Birch, LLP

(57) ABSTRACT

An information processing apparatus includes an additional information conversion means for converting a text of related information into additional information and outputting this additional information, and for outputting an amount of additional information for each point of interest, an embedding region allocating means for outputting region management information including the amount of additional information, for allocating an embedding region for the additional information in an original digital input image on the basis of image size information and the amount of additional information, and for outputting information on the embedding region as region information, and an information embedding means for embedding the region management information in a predetermined region in the original digital input image, and also embedding the additional information in the original digital input image on the basis of the region information to generate and output a watermarked image.

16 Claims, 23 Drawing Sheets

Figure 3:
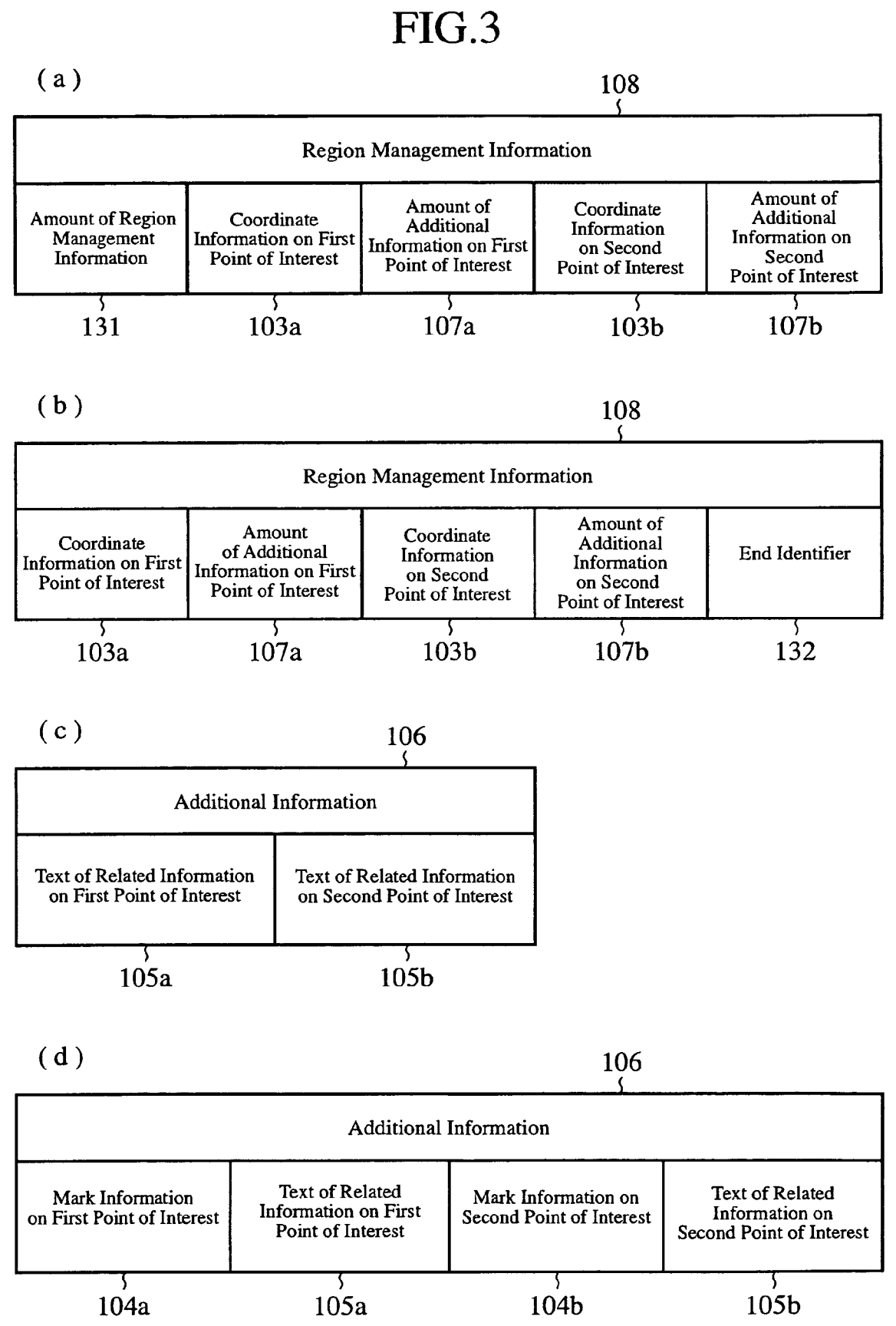

| Region Management Information | | | | |
|---|---|---|---|---|
| Amount of Region Management Information | Coordinate Information on First Point of Interest | Amount of Additional Information on First Point of Interest | Coordinate Information on Second Point of Interest | Amount of Additional Information on Second Point of Interest |
| 131 | 103a | 107a | 103b | 107b |

(b)

108

| Region Management Information | | | | |
|---|---|---|---|---|
| Coordinate Information on First Point of Interest | Amount of Additional Information on First Point of Interest | Coordinate Information on Second Point of Interest | Amount of Additional Information on Second Point of Interest | End Identifier |
| 103a | 107a | 103b | 107b | 132 |

(c)

106

| Additional Information | |
|---|---|
| Text of Related Information on First Point of Interest | Text of Related Information on Second Point of Interest |
| 105a | 105b |

(d)

106

| Additional Information | | | |
|---|---|---|---|
| Mark Information on First Point of Interest | Text of Related Information on First Point of Interest | Mark Information on Second Point of Interest | Text of Related Information on Second Point of Interest |
| 104a | 105a | 104b | 105b |

Figure 4:
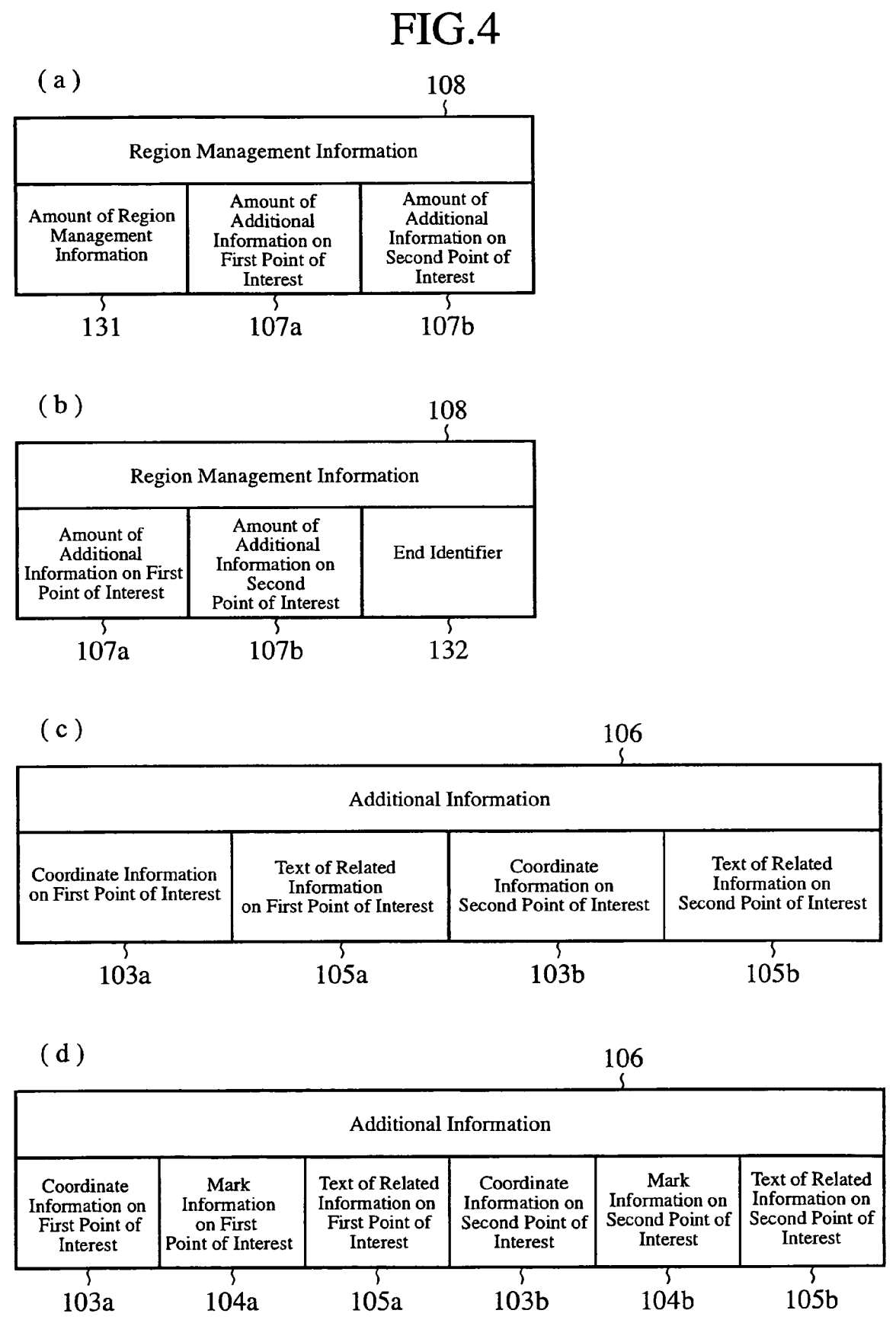

| Region Management Information | | |
|---|---|---|
| Amount of Region Management Information | Amount of Additional Information on First Point of Interest | Amount of Additional Information on Second Point of Interest |
| 131 | 107a | 107b |

(b)

108

| Region Management Information | | |
|---|---|---|
| Amount of Additional Information on First Point of Interest | Amount of Additional Information on Second Point of Interest | End Identifier |
| 107a | 107b | 132 |

(c)

106

| Additional Information | | | |
|---|---|---|---|
| Coordinate Information on First Point of Interest | Text of Related Information on First Point of Interest | Coordinate Information on Second Point of Interest | Text of Related Information on Second Point of Interest |
| 103a | 105a | 103b | 105b |

(d)

106

| Additional Information | | | | | |
|---|---|---|---|---|---|
| Coordinate Information on First Point of Interest | Mark Information on First Point of Interest | Text of Related Information on First Point of Interest | Coordinate Information on Second Point of Interest | Mark Information on Second Point of Interest | Text of Related Information on Second Point of Interest |
| 103a | 104a | 105a | 103b | 104b | 105b |

(a)
101
(b)
101
141a
142a
(c)
101
141a
142a
141b
142b
(d)
143
101
141a
141b
142a
142b (a)
101
(b)
101
141a
141b
(c)
143
101
141a
141b
(d)
143
142a
141b
142b
141a
101

14
Point of Interest Input Switching Means
11
Image Display Means
12
Point of Interest Specifying Means
13
Related Information Input Means
19
Display Position Determining Means
15
Additional Information Conversion Means
16
Embedding Region Allocating Means
17
Information Embedding Means
101
102
103
104
105
106
107
108
109
110
122
123

Figure 16:
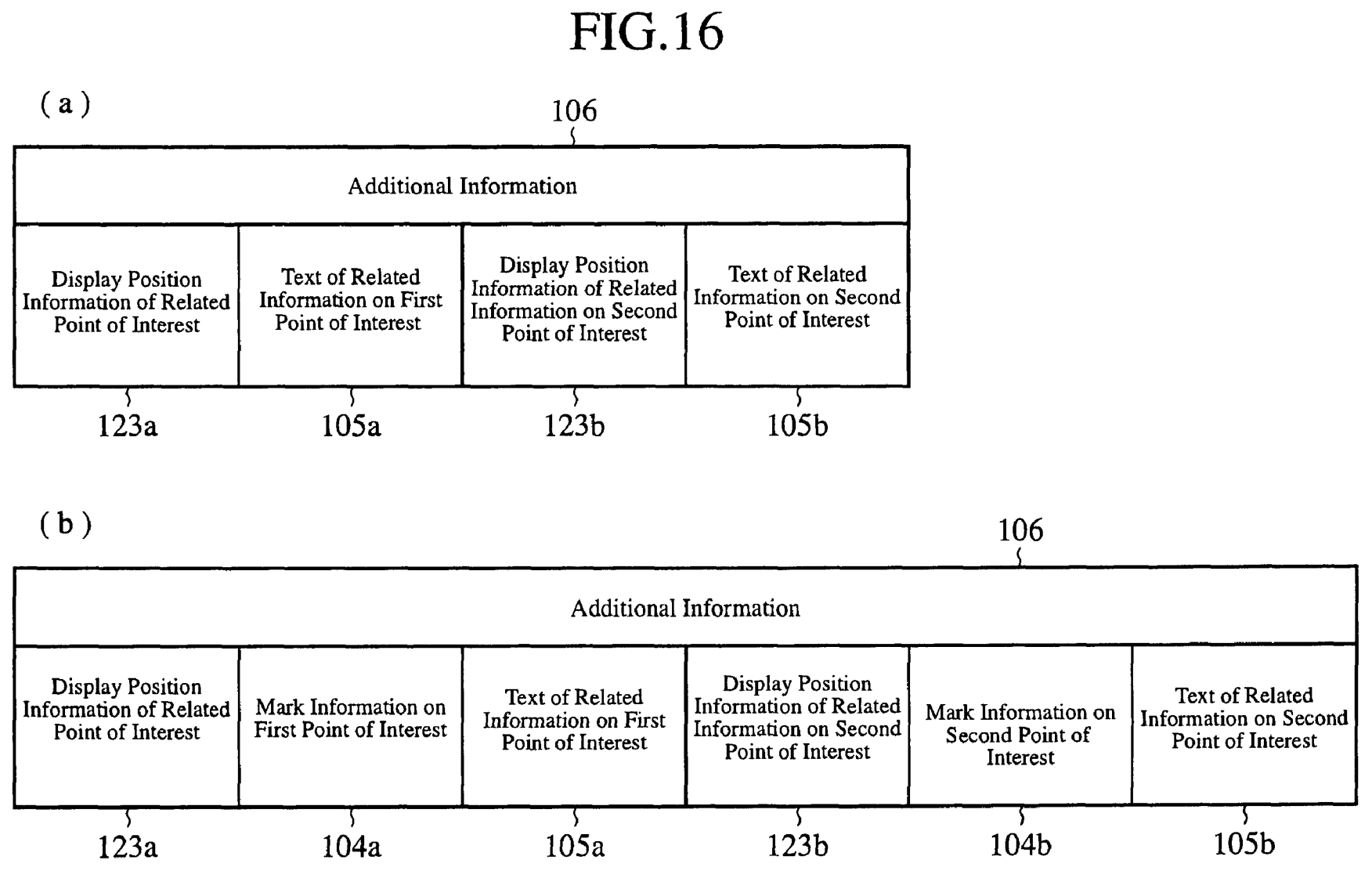

| Additional Information | | | |
|---|---|---|---|
| Display Position Information of Related Point of Interest | Text of Related Information on First Point of Interest | Display Position Information of Related Information on Second Point of Interest | Text of Related Information on Second Point of Interest |
| 123a | 105a | 123b | 105b |

(b)

106

| Additional Information | | | | | |
|---|---|---|---|---|---|
| Display Position Information of Related Point of Interest | Mark Information on First Point of Interest | Text of Related Information on First Point of Interest | Display Position Information of Related Information on Second Point of Interest | Mark Information on Second Point of Interest | Text of Related Information on Second Point of Interest |
| 123a | 104a | 105a | 123b | 104b | 105b |

Figure 17:
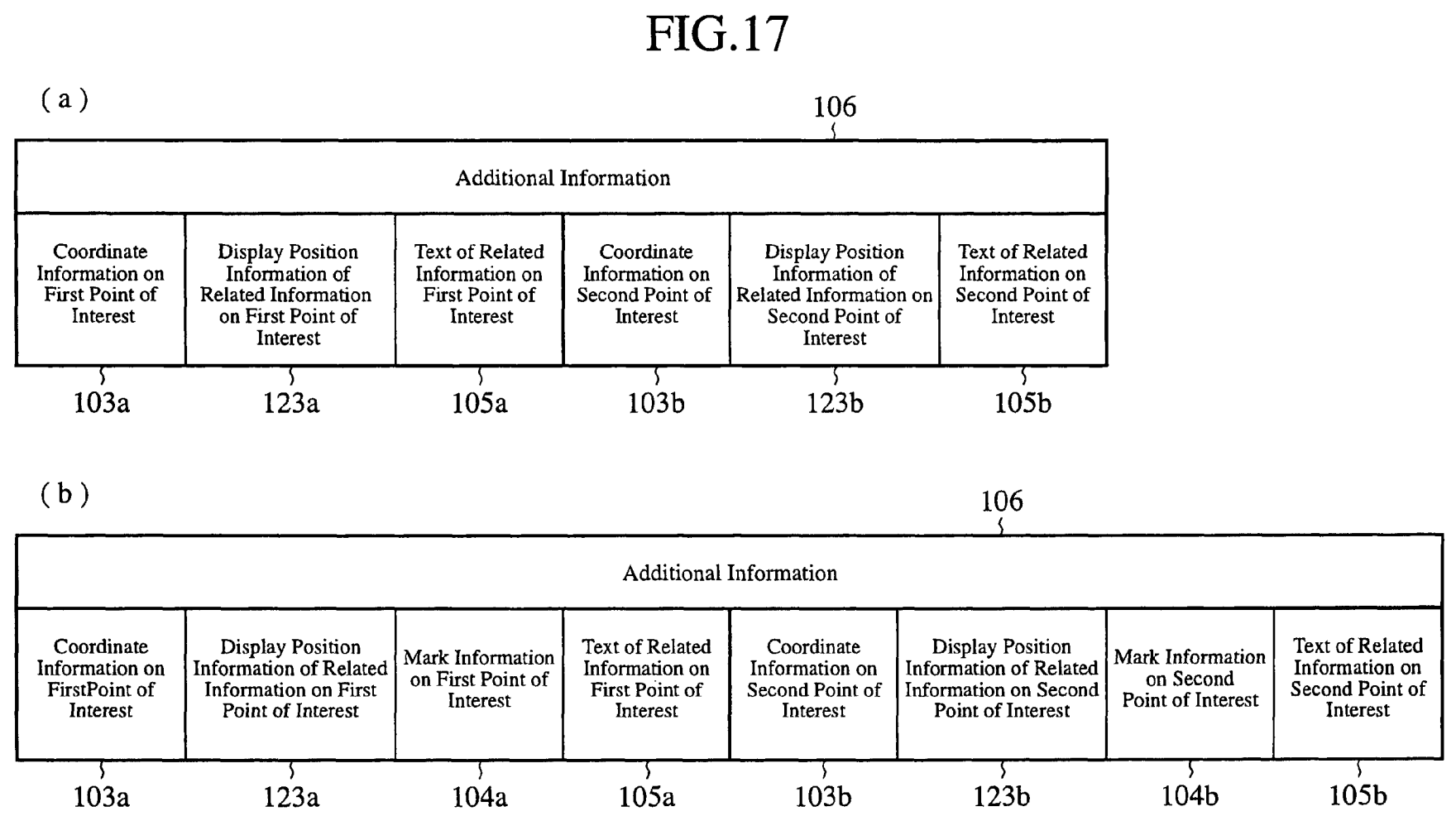

| Additional Information (106) | | | | | |
|---|---|---|---|---|---|
| Coordinate Information on First Point of Interest | Display Position Information of Related Information on First Point of Interest | Text of Related Information on First Point of Interest | Coordinate Information on Second Point of Interest | Display Position Information of Related Information on Second Point of Interest | Text of Related Information on Second Point of Interest |
| 103a | 123a | 105a | 103b | 123b | 105b |

(b)

| Additional Information (106) | | | | | | | |
|---|---|---|---|---|---|---|---|
| Coordinate Information on FirstPoint of Interest | Display Position Information of Related Information on First Point of Interest | Mark Information on First Point of Interest | Text of Related Information on First Point of Interest | Coordinate Information on Second Point of Interest | Display Position Information of Related Information on Second Point of Interest | Mark Information on Second Point of Interest | Text of Related Information on Second Point of Interest |
| 103a | 123a | 104a | 105a | 103b | 123b | 104b | 105b |

| Region Management Information | | | | | | | | |
|---|---|---|---|---|---|---|---|---|
| Amount of Region Management Information | Coordinate Information on First Point of Interest | Amount of Additional Information on First Point of Interest | Display Position Information of Related Information on First Point of Interest | Mark Information on First Point of Interest | Coordinate Information on Second Point of Interest | Amount of Additional Information on Second Point of Interest | Display Position Information of Related Information on Second Point of Interest | Mark Information on Second Point of Interest |
| 131 | 103a | 107a | 123a | 104a | 103b | 107b | 123b | 104b |

(b)

108

| Region Management Information | | | | | | | | |
|---|---|---|---|---|---|---|---|---|
| Amount of Region Management Information | Coordinate Information on First Point of Interest | Coordinate Information on Second Point of Interest | Amount of Additional Information on First Point of Interest | Amount of Additional Information on Second Point of Interest | Display Position Information of Related Information on First Point of Interest | Display Position Information of Related Information on Second Point of Interest | Mark Information on First Point of Interest | Mark Information on Second Point of Interest |
| 131 | 103a | 103b | 107a | 107b | 123a | 123b | 104a | 104b |

| Additional Information | | | | | | | |
|---|---|---|---|---|---|---|---|
| Coordinate Information on First Point of Interest | Coordinate Information on Second Point of Interest | Display Position Information of Related Information on First Point of Interest | Display Position Information of Related Information on Second Point of Interest | Mark Information on First Point of Interest | Mark Information on Second Point of Interest | Text of Related Information on First Point of Interest | Text of Related Information on Second Point of Interest |
| 103a | 103b | 123a | 123b | 104a | 104b | 105a | 105b |

(a)
(b)
(c)
(d)
101
141a
141b
142a
142b
143
145a
145b (a)
(b)
(c)
(d)
101
141a
141b
145a
143
142a
142b

Point of Interest Input Switching Means
14
Image Display Means
11
Point of Interest Specifying Means
12
Related Information Input Means
13
Display Position Determining Means
19
Number of Characters
Embedding Region Allocating Means
16
Amount-of-Related-Information Adjustment Means
18
Additional Information Conversion Means
15
Information Embedding Means
17
101
102
103
104
105
106
107
108
109
110
111
112
123

240,250
Camera-Equipped Mobile Phone/PC
245
241
Receiving Means
110
20
Information Processing Means (Detection)
121
242
Storage Means
243
Transmitting Means
244
Medium/ External Device
245

INFORMATION PROCESSING APPARATUS AND INFORMATION PROCESSING METHOD

FIELD OF THE INVENTION

The present invention relates to an information processing apparatus for and an information processing method of embedding related information on a point of interest in a digital image by means of an electronic watermarking method, or detecting related information embedded in a digital image.

BACKGROUND OF THE INVENTION

A prior art information processing apparatus, as disclosed in, for example, patent reference 1, allows the user to specify a region of interest first, acquires information on the position of the region of interest, and forms additional information, as well as information attached to the position information (i.e., utilization information). The prior art information processing apparatus then embeds the additional information, just as it is, in an embedding region of original image data, which can be the whole of the original image data or the specified region of interest, by means of an electronic watermarking method, and manages the image data and additional information without discriminating between them. This patent reference 1 also discloses a patchwork method and a basic electronic watermarking method associated with reliability distance. Using the patchwork method and basic electronic watermarking method, the prior art information processing apparatus carries out highlighting of the boundary of the region of interest in which the additional information is embedded to produce a display of the position of the detected region of interest on the image.

Patent reference 1: JP, 2002-190945, A (see paragraph numbers 0058 to 0061, 0065 to 0081, and 0158)

A problem with the prior art information processing apparatus constructed as mentioned above is that while the user is allowed to specify a region of interest first, because in a mode in which the prior art information processing apparatus embeds additional information in only the region of interest, the prior art information processing apparatus does not refer to the amount of the additional information to be embedded in the region of interest, and therefore must provide a margin for the specified region of interest to make it larger in a stage where the amount of the additional information to be embedded in the region of interest is undecided, the prior art information processing apparatus cannot embed the additional information in the region of interest efficiently especially in a case in which the amount of the additional information to be embedded in the image is restricted.

Another problem is that because the prior art information processing apparatus must specify the region of interest on the image so as to make it larger, it cannot show only the intended region of interest effectively.

The present invention is made in order to solve the above-mentioned problems, and it is therefore an object of the present invention to provide an information processing apparatus for and an information processing method of referring to the amount of additional information including related information on a point of interest on an image specified by the user and allocating an embedding region required for embedding of the additional information appropriately so that the additional information can be embedded efficiently in a whole image region, and only the point of interest, as an intended region of interest, and the related information can be shown effectively.

DISCLOSURE OF THE INVENTION

An information processing apparatus in accordance with the present invention includes: an image display means for displaying an original digital input image, and for outputting information on a size of the image; a point of interest specifying means for specifying a point of interest in the original digital input image currently displayed on a basis of an inputted instruction; a related information output means for inputting related information on the above-mentioned point of interest, and for outputting a text of the related information; an additional information conversion means for converting the text of the above-mentioned related information to additional information and outputting this additional information, and for outputting an amount of the additional information on the above-mentioned each point of interest; an embedding region allocating means for outputting region management information including the above-mentioned amount of additional information, for allocating an embedding region for the above-mentioned additional information in the above-mentioned original digital input image on a basis of the above-mentioned image size information and the above-mentioned amount of the additional information, and for outputting information on the above-mentioned embedding region as region information; and an embedding information means for embedding the above-mentioned region management information in a predetermined region in the above-mentioned original digital input image, and also embedding the above-mentioned additional information in the above-mentioned original digital input image on a basis of the above-mentioned region information to generate and output an watermarked image.

Therefore, the present embodiment offers an advantage of being able to embed the additional information into the whole image region efficiently, thereby being able to show only an intended region of interest effectively.

BRIEF DESCRIPTION OF THE FIGURES

FIG. 3 is a diagram showing examples of the formats of region management information and additional information in a case in which coordinate information on each point of interest is included in the region management information in the information processing apparatus in accordance with embodiment 1 of the present invention;

FIG. 4 is a diagram showing examples of the formats of the region management information and additional information in a case in which the coordinate information on each point of interest is included in the additional information in the information processing apparatus in accordance with embodiment 1 of the present invention;

FIG. 16 is a diagram showing examples of the format of additional information in a case in which coordinate information on each point of interest is included in region management information in the information processing apparatus in accordance with embodiment 3 of the present invention;

FIG. 17 is a diagram showing examples of the format of the additional information in a case in which coordinate information on each point of interest is included in the additional information in the information processing apparatus in accordance with embodiment 3 of the present invention;

FIG. 18 is a diagram showing examples of the format of the region management information in a case in which only a text of related information on each point of interest is included in the additional information in the information processing apparatus in accordance with embodiment 3 of the present invention;

FIG. 19 is a diagram showing an example of the format of the additional information in which a plurality of data fields are successively arranged for each point of interest in the information processing apparatus in accordance with embodiment 3 of the present invention;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
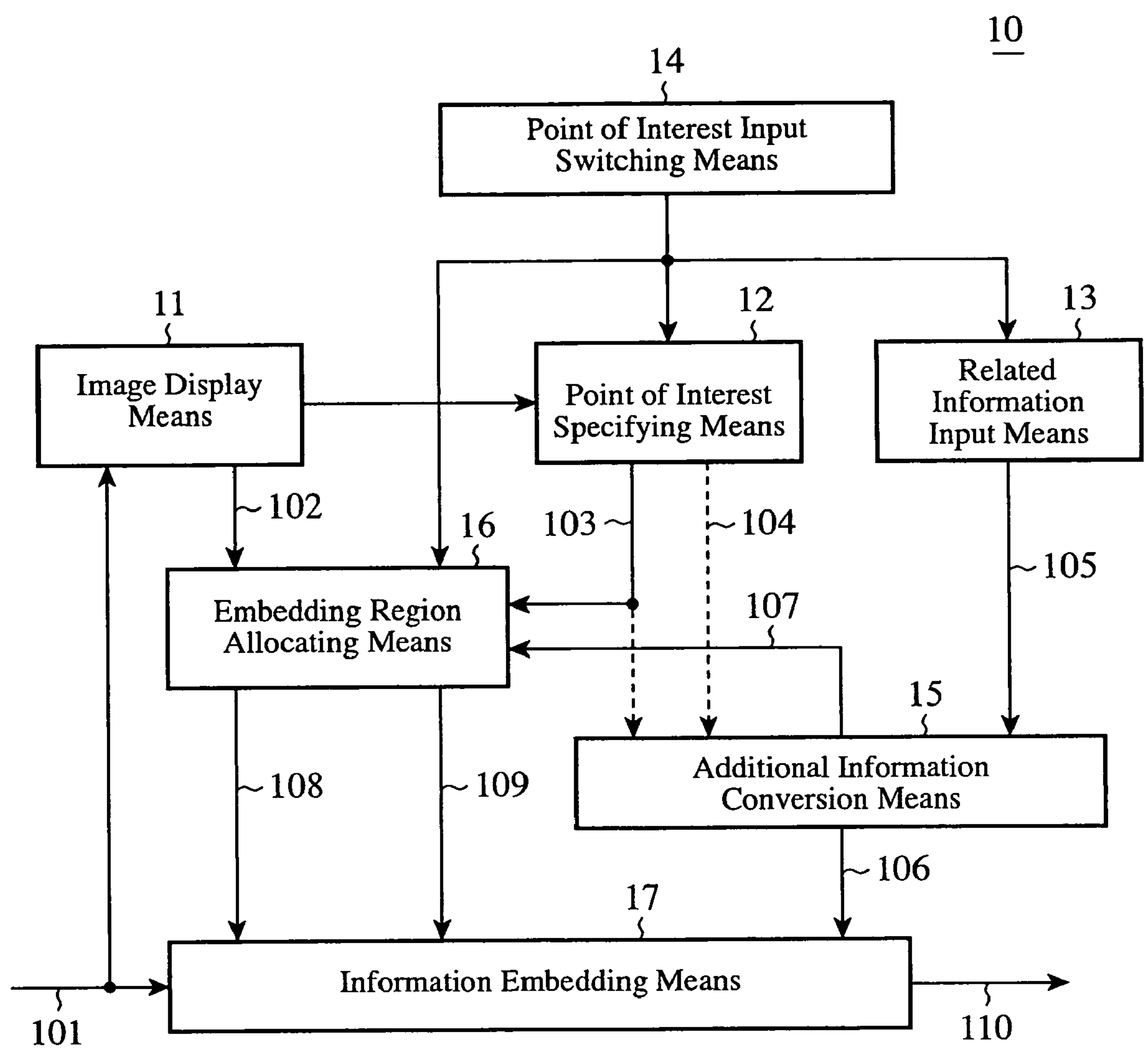
FIG. 1 is a block diagram showing the structure of an information processing apparatus in accordance with embodiment 1 of the present invention which is an embedding side.

FIG. 1 is a block diagram showing the structure of an information processing apparatus 10 in accordance with embodiment 1 of the present invention which serves as an embedding side, for embedding region management information and additional information in an image. This information processing apparatus 10 is provided with an image display means 11, a point of interest specifying means 12, a related information input means 13, a point of interest input switching means 14, an additional information conversion means 15, an embedding region allocating means 16, and an information embedding means 17.

Next, the operation of the information processing apparatus 10 which is an embedding side will be explained.

The image display means 11 displays an original digital input image 101 inputted thereto, and outputs image size information 102 on the size of the original digital input image 101. The point of interest specifying means 12 specifies a desired point of interest on the original digital input image 101 currently being displayed by the image display means 11 according to the user's input, and outputs coordinate information 103 on the coordinates of the point of interest. When specifying a mark indicating the point of interest on the image if needed, the point of interest specifying means 12 also specifies and outputs mark information 104 on each point of interest either according to the user's input in a case of specifying the shape, such as a quadrangle or a circle, and size of the mark, or automatically in a case of placing, as the mark, a predetermined shape, such as a point.

The related information input means 13 inputs related information associated with the specified point of interest from the user, and outputs a text 105 of the related information. The point of interest input switching means 14 makes the point of interest specifying means 12, related information input means 13, and embedding region allocating means 16 carry their respective processes for each point of interest according to the user's specifications.

The additional information conversion means 15 accepts the mark information 104 on each point of interest delivered thereto from the point of interest specifying means 12 if needed, and the text 105 of the related information from the related information input means 13, and converts the mark information 104 on each point of interest delivered thereto if needed, and the text 105 of the related information into formats of additional information 106 and outputs them. The additional information conversion means 15 also outputs an amount 107 of the additional information for each point of interest.

As shown by a dotted line indicating the coordinate information 103 on each point of interest in FIG. 1, the additional information conversion means 15 inputs the coordinate information 103 on each point of interest from the point of interest specifying means 12, the mark information 104 on each point of interest from the point of interest specifying means 12 if needed, and the text 105 of the related information from the related information input means 13, and converts the coordinate information 103 on each point of interest, mark information 104 on each point of interest if needed, and the text 105 of the related information to formats of additional information 106, and outputs them. The additional information conversion means 15 can output an amount 107 of additional information on each point of interest.

The embedding region allocating means 16 accepts the image size information 102 from the image display means 11, the coordinate information 103 on each point of interest from the point of interest specifying means 12, and the amount 107 of additional information for each point of interest from the additional information conversion means 15, and allocates an embedding region for the additional information 106 on the original digital input image 101 on the basis of the image size information 102 and the amount 107 of additional information on each point of interest. The embedding region allocating means 16 also generates and outputs region management information 108 including both the coordinate information 103 on each point of interest and the amount 107 of additional information on each point of interest, and outputs region information 109 indicating the embedding region for the additional information 106.

In a case in which the coordinate information 103 on each point of interest from the point of interest specifying means 12 is outputted to the additional information conversion means 15, the embedding region allocating means 16 accepts the image size information 102 from the image display means 11, and the amount 107 of additional information on each point of interest from the additional information conversion means 15, and allocates an embedding region for the additional information 106 on the original digital input image 101 on the basis of the image size information 102 and the amount 107 of additional information on each point of interest. The embedding region allocating means 16 also generates and outputs region management information 108 including the amount 107 of additional information on each point of interest, and outputs region information 109 indicating the embedding region for the additional information 106.

The information embedding means 17 embeds the region management information 108 from the embedding region allocating means 16 in a predetermined region of the original digital input image 101 by means of an electronic watermarking method, and also embeds the additional information 106 from the additional information conversion means 15 in the original digital input image 101 on the basis of the region information 109 from the embedding region allocating means 16 by means of the electronic watermarking method, so as to output a watermarked image 110.

In this case, the information embedding means 17 embeds the region management information 108 from the embedding region allocating means 16 in the predetermined region of the original digital input image 101. As an alternative, the embedding region allocating means 16 can allocate an embedding region for the region management information 108 according to an instruction from the user, and incorporate it into the region information 109 and output this information, and the information embedding means 17 can also embed the region management information 108 in the predetermined region on the basis of the region information 109 from the embedding region allocating means 16. In this case, the embedding region for the region management information 108 is notified to a detection side, and the information is shared between the embedding side and the detection side.

The embedding region allocating means 16 can also refer to the amount 107 of additional information on each point of interest, and allocate an optimal region size of embedding region for the additional information 106 to be embedded in the original digital input image 101 without providing any redundancy for the region size. As an alternative, redundancy can be intentionally provided for the region size. For example, the embedding region for the additional information is allocated so that a fixed quantity or a fixed ratio of redundancy can be provided for the region size of the embedding region. Alternatively, the embedding region for the additional information is allocated so that multiple of unit sizes, such as multiple bytes or words, of redundancy can be provided for the region size of the embedding region.

After a cryptographic key is established between the embedding and detection sides, the region management information 108 and additional information 106 can be embedded in the original input image by means of the electronic watermarking method after being encrypted using the key, and they can be decrypted after being detected. In this case, the embedding region allocating means 16 and additional information conversion means 15 can carry out encryption of the region management information 108 and additional information 106 as a stage preceding the stage of embedding by means of the electronic watermarking method, and an embedding region allocating means 23 and an additional information reverse conversion means 24, which are disposed as a stage next to the stage of embedding by means of the electronic watermarking method, of a below-mentioned information processing apparatus 20, which serves as the detection side as shown in FIG. 2, can have a function of carrying out decryption of the region management information 108 and additional information 106.

Figure 2:
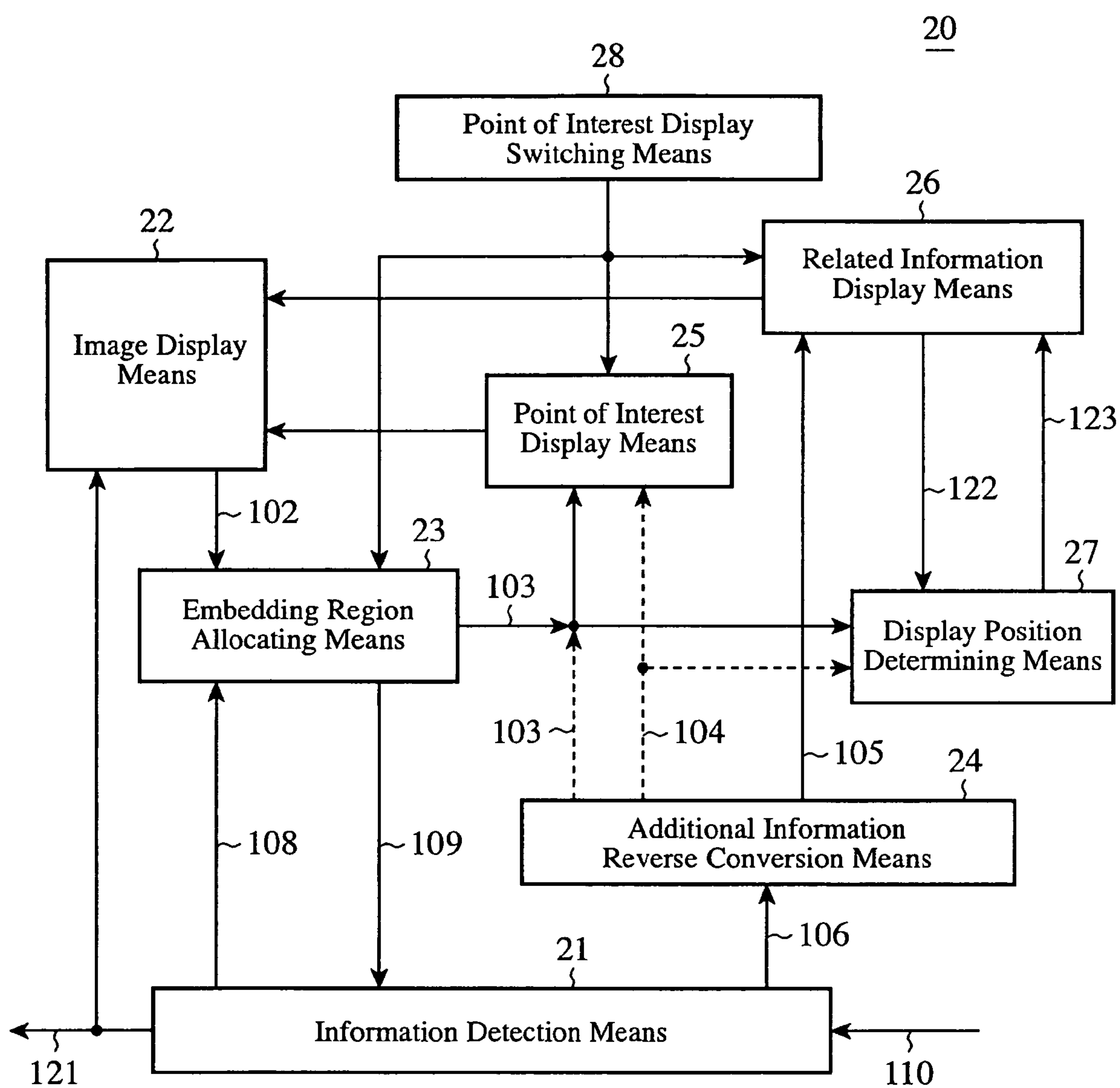
FIG. 2 is a block diagram showing the structure of an information processing apparatus in accordance with embodiment 1 of the present invention which is a detection side.

FIG. 2 is a block diagram showing the structure of an information processing apparatus 20 in accordance with embodiment 1 of the present invention which serves as a detection side for detecting the region management information and additional information. This information processing apparatus 20 which is a detection side is provided with an information detection means 21, an image display means 22, the embedding region allocating means 23, the additional information reverse conversion means 24, a point of interest display means 25, a related information display means 26, a display position determining means 27, and a point of interest display switching means 28.

Next, the operation of the information processing apparatus 20 which is a detection side will be explained.

The information detection means 21 detects the region management information 108 which is embedded in the predetermined region, which has been notified thereto from the information processing apparatus 10 which is the embedding side, by means of the electronic watermarking method, from the inputted watermarked image 110, and outputs a digitized output image 121.

If the region management information 108 is not embedded in the predetermined region, the embedding region allocating means 23 outputs region information 109 indicating the embedding region for the region management information 108 on the basis of an instruction from the user which has been notified thereto from the embedding side, and the information detection means 21 detects the region management information 108 embedded in the embedding region on the basis of the region information 109 from the inputted watermarked image 110.

The image display means 22 displays the digitized output image 121 outputted from the information detection means 21, and outputs image size information 102 on the digitized output image 121.

The embedding region allocating means 23 allocates the embedding region for the additional information 106 on the digitized output image 121 on the basis of both the image size information 102 from the image display means 22 and the amount 107 of additional information on each point of interest included in the region management information 108 detected by the information detection means 21, and outputs region information 109 indicating the embedding region for the additional information 106 and also outputs the coordinate information 103 on each point of interest included in the region management information 108.

In the case in which the coordinate information 103 on each point of interest is included in the additional information 106, the embedding region allocating means 23 allocates the embedding region for the additional information 106 in the digitized output image 121 on the basis of the image size information 102 from the image display means 22 and the amount of additional information 107 on each point of interest included in the region management information 108 detected by the information detection means 21, and outputs the region information 109 indicating the embedding region for the additional information 106.

An algorithm of allocating the embedding region for the additional information 106 on the basis of the amount 107 of additional information on each point of interest which the embedding region allocating means 23 uses is predetermined between the embedding side and the detection side so that it is the same as an algorithm of allocating the embedding region for the additional information 106 which the embedding region allocating means 16 of the information processing apparatus 10 which is the embedding side uses.

The information detection means 21 detects the additional information 106, which is embedded in the watermarked image 110 by means of the electronic watermarking method, from the watermarked image 110 on the basis of the region information 109 outputted from the embedding region allocating means 23, and outputs the detected additional information 106.

The additional information reverse conversion means 24 carries out reverse conversion of the additional information 106 outputted from the information detection means 21, and outputs the text 105 of the related information and also outputs the mark information 104 on each point of interest in a case in which a mark indicating each point of interest is specified.

In a case in which the coordinate information 103 on each point of interest is included in the additional information 106, the additional information reverse conversion means 24 carries out reverse conversion of the additional information 106 outputted from the information detection means 21, and outputs the text 105 of the related information and also outputs the mark information 104 on each point of interest when the mark indicating each point of interest is specified.

In the case in which a mark indicating each point of interest is specified, the point of interest display means 25 displays the mark based on the mark information 104 outputted from the additional information reverse conversion means 24 at a position specified by the coordinate information 103 on each point of interest outputted from the embedding region allocating means 23 or the additional information reverse conversion means 24 on the digitized output image. In contrast, in a case in which no mark indicating each point of interest is specified, the point of interest display means 25 displays a predetermined mark at the specified position on the digitized output image 121.

The related information display means 26 accepts the text 105 of the related information associated with a point of interest to be displayed from the additional information reverse conversion means 24, and calculates and outputs the number 122 of characters in the text 105. The display position determining means 27 determines an optimal position of display of the related information so that the point of interest to be displayed is not hided by the corresponding related information on the basis of the coordinate information 103 on the point of interest outputted from the embedding region allocating means 23 or additional information reverse conversion means 24, the mark information 104 from the additional information reverse conversion means 24, and the number of characters 122 in the text 105 of the related information from the related information display means 26, and outputs information 123 on the determined optimal display position.

The related information display means 26 displays the related information on the digitized output image 121 displayed by the image display means 22 on the basis of the information 123 on the determined optimal display position which is outputted from the display position determining means 27. The point of interest display switching means 28 makes the embedding region allocating means 23, point of interest display means 25, and related information display means 26 carry their respective processes for each point of interest according to an instruction from the user.

The display position information 123 determined by the display position determining means 27 is required for the related information display means 26 to determine a display area needed for the display of the related information from the number 122 of characters in the text 105 of the related information on the point of interest to be displayed, and to specify the display area. In a case in which the display area is a rectangle, the coordinates of two opposite vertices can be defined as the display position information 123. As an alternative, in a case in which the size of the display area is obvious for the related information display means 26, the coordinates of a predetermined vertex of a rectangle can be defined as the display position information 123.

In FIGS. 1 and 2, the mark information 104 on each point of interest can be defined by graphic information including the shape and size of a mark such as a point, the width of a line, and a pattern like a dashed line if needed. In a case in which the point of interest specifying means 12 of the information processing apparatus 10 which is the embedding side shown in FIG. 1 does not specify the mark information 104 in advance, the point of interest display means 25 of the information processing apparatus 20 which is the detection side shown in FIG. 2 determines the description of a predetermined mark definition, and displays the point of interest.

As explained above, the coordinate information 103 on the point of interest is included in either the region management information 108 or the additional information 106. In FIG. 1, whether the coordinate information 103 on the point of interest which the point of interest specifying means 12 outputs is inputted to either the embedding region allocating means 16 or the additional information conversion means 15 depends on which the region management information 108 or the additional information 106 includes the coordinate information 103 on the point of interest. Similarly, in FIG. 2, whether the coordinate information 103 on the point of interest is outputted to either the embedding region allocating means 23 or the additional information reverse conversion means 24 depends on which the region management information 108 or the additional information 106 includes the coordinate information 103 on the point of interest in FIG. 1.

FIG. 3 is a diagram showing examples of the formats of the region management information 108 and additional information 106 in a case in which the coordinate information 103 on each point of interest is included in the region management information 108. FIGS. 3(*a*) and 3(*b*) show examples of the format of the region management information 108, and FIGS. 3(*c*) and 3(*d*) show examples of the format of the additional information 106.

In FIG. 3(*a*), an amount 131 of region management information indicating the number of point of interests, coordinate information 103*a* on a first point of interest, an amount 107*a* of additional information on the first point of interest, coordinate information 103*b* on a second point of interest, and an amount 107*b* of additional information on the second point of interest are included in the region management information 108. This amount 131 of region management information is information for notifying the number of point of interests to the embedding region allocating means 23 of the information processing apparatus which is the detection side, and the embedding region allocating means 23 allocates an embedding region for the additional information 106 only a number of times corresponding to the number of point of interests. In a case in which the format of each of the two pieces of coordinate information 103*a* and 103*b* on the first and second point of interests is the same as the format of each of the amounts 107*a* and 107*b* of additional information on the first and second point of interests, the amount 131 of region management information can be the number of bytes of the total size of the region management information 108. In this case, by subtracting the number of bytes of the amount 131 of region management information, which is a fixed size, from the total number of bytes, and dividing the subtraction result by a number of bytes which is equal to the sum of the amount of one set of point of interest coordinates 103, which is a fixed size, and the amount 107 of additional information, the number of point of interests can be acquired.

In FIG. 3(*b*), an end identifier 132 indicating an end at the end of the format is included instead of the amount 131 of region management information of FIG. 3(*a*), the embedding region allocating means 23 allocates an embedding region for the additional information 106 until it detects this end identifier 132.

In FIG. 3(*c*), a text 105*a* of related information on the first point of interest and a text 105*b* of related information on the second point of interest are included in the additional information 106. In FIG. 3(*d*), mark information 104*a* on the first point of interest, the text 105*a* of the related information on the first point of interest, mark information 104*b* on the second point of interest, and the text 105*b* of the related information on the second point of interest are included in the additional information 106.

FIG. 4 is a diagram showing examples of the formats of the region management information 108 and additional information 106 in a case in which the coordinate information 103 on each point of interest is included in the additional information 106. FIGS. 4(*a*) and 4(*b*) show examples of the format of the region management information 108, and FIGS. 4(*c*) and 4(*d*) show examples of the format of the additional information 106.

In FIG. 4(*a*), the amount 131 of region management information indicating the number of point of interests, the amount 107*a* of additional information on the first point of interest, and the amount 107*b* of additional information on the second point of interest are included in the region management information 108. In FIG. 4(*b*), an end identifier 132 indicating an end at the end of the format is included instead of the amount 131 of region management information of FIG. 4(*a*).

In FIG. 4(*c*), the coordinate information 103*a* on the first point of interest, text 105*a* of the related information on the first point of interest, coordinate information 103*b* on the second point of interest, and text 105*b* of the related information on the second point of interest are included in the additional information 106. In FIG. 4(*d*), the coordinate information 103*a* on the first point of interest, mark information 104*a* on the first point of interest, text 105*a* of the related information on the first point of interest, coordinate information 103*b* on the second point of interest, mark information 104*b* on the second point of interest, and text 105*b* of the related information on the second point of interest are included in the additional information 106.

In the formats of the region management information 108 and additional information 106 which are shown in FIGS. 3 and 4, the order of the coordinate information 103 on each point of interest and the amount 107 of additional information on each point of interest in the region management information 108, and the order of the coordinate information 103 on each point of interest, mark information 104 on each point of interest, text 105 of the related information on each point of interest, and so on in the additional information 106 are not limited to the examples shown in the figures. In either of the formats, the data fields can be interchanged.

Figure 5:
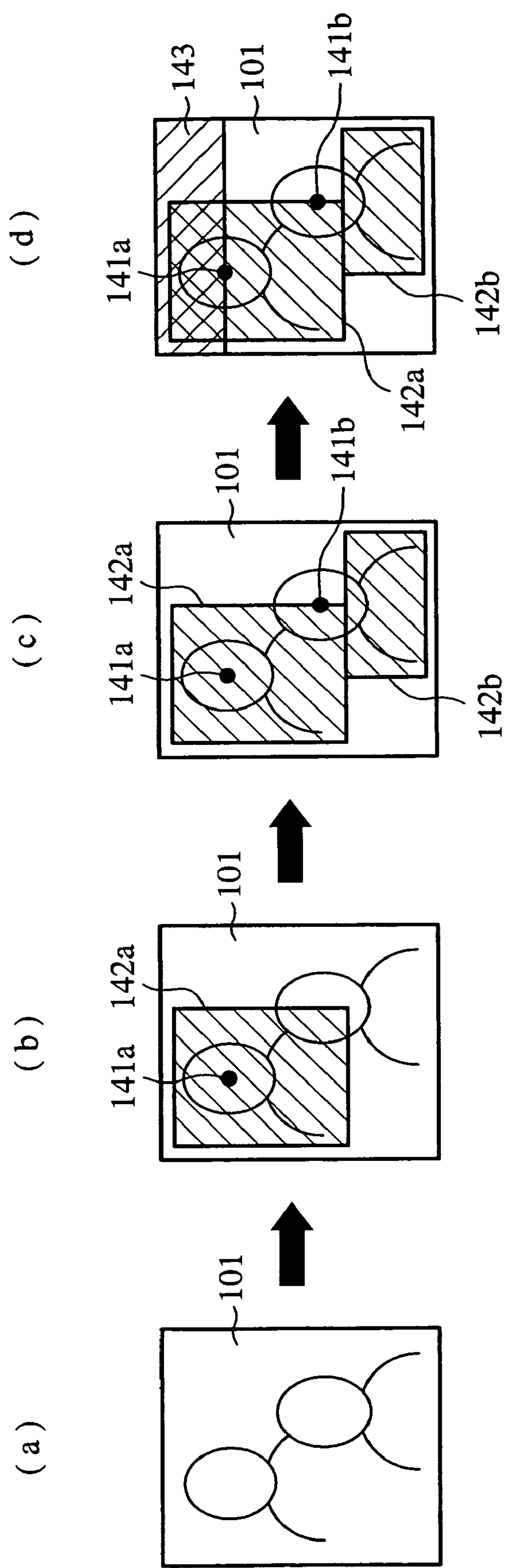
FIG. 5 is a conceptual diagram for explaining an example of processing carried out by the information processing apparatus in accordance with embodiment 1 of the present invention which is the embedding side.

FIG. 5 is a conceptual diagram for explaining an example of processing carried out by the information processing apparatus 10 which is the embedding side. This example will be explained assuming that, as shown in FIG. 5(*a*), the original digital input image 101 is an image in which two persons are captured as objects to be shot. As shown in FIG. 5(*b*), a first point of interest 141*a* for a first object is specified according to the user's input from the point of interest specifying means 12, and the related information associated with the first point of interest 141*a* is inputted through the user's input from the related information input means 13. At that time, the mark information 104 including the shape and size of a mark indicating the first point of interest 141*a* can be simultaneously inputted through the point of interest specifying means 102. The embedding region allocating means 16 then allocates an embedding region 142*a* for the additional information 106 and outputs it as region information 109 on the basis of the image size information 102 from the image display means 11 and the amount 107 of additional information on the point of interest 141*a* from the additional information conversion means 15, and the information embedding means 17 outputs the additional information 106 as region information 109, and embeds it into the embedding region 142*a*.

Next, as shown in FIG. 5(*c*), a second point of interest 141*b*, which is a second object, and the related information on the second point of interest are specified according to the same procedure, the mark information 104 on the second point of interest is inputted, an embedding region 142*b* for the additional information 106 on the second point of interest 141*b* is allocated and the additional information 106 is embedded in the embedding region 142*b* so that the embedding region 142*b* for the additional information 106 on the second point of interest 141*b* does not overlap the embedding region 142*a* for the additional information 106 on the first point of interest 141*a*. Finally, as shown in FIG. 5(*d*), the information embedding means 17 embeds the region management information 108 in an embedding region 143 which is a predetermined region. A starting point of the embedding region 143 can be fixedly placed at the upper left corner of the original digital input image 101, as shown in this figure, or can be alternatively placed at another position. This example of FIG. 5 is shown as an example in which the embedding region 143 in which the region management information is finally embedded can overlap the region 141*a*.

Figure 6:
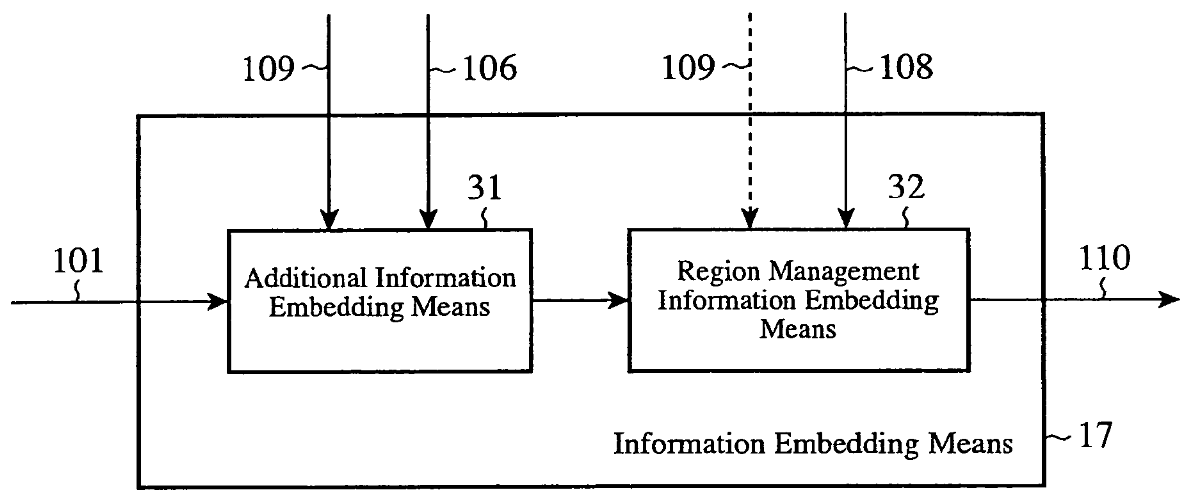
FIG. 6 is a block diagram showing the internal structure of an information embedding means of the information processing apparatus in accordance with embodiment 1 of the present invention which is the embedding side.

FIG. 6 is a block diagram showing the internal structure of the information embedding means 17. This information embedding means 17 is provided with an additional information embedding means 31 and a region management information embedding means 32, and is so constructed as to embed the region management information 108 in the corresponding embedding region after embedding the additional information 106 on each point of interest in the corresponding embedding region. The information embedding means 17 shown in FIG. 6 can thus make the embedding region 143 in which the region management information 108 is embedded overlap the embedding region 142*a* in which the additional information 106 is embedded, as shown in FIG. 5. In FIG. 6, the region information 109 inputted to the region management information embedding means 32 is outputted from the embedding region allocating means 16 in a case in which the region management information 108 is not embedded in the predetermined region.

Figure 7:
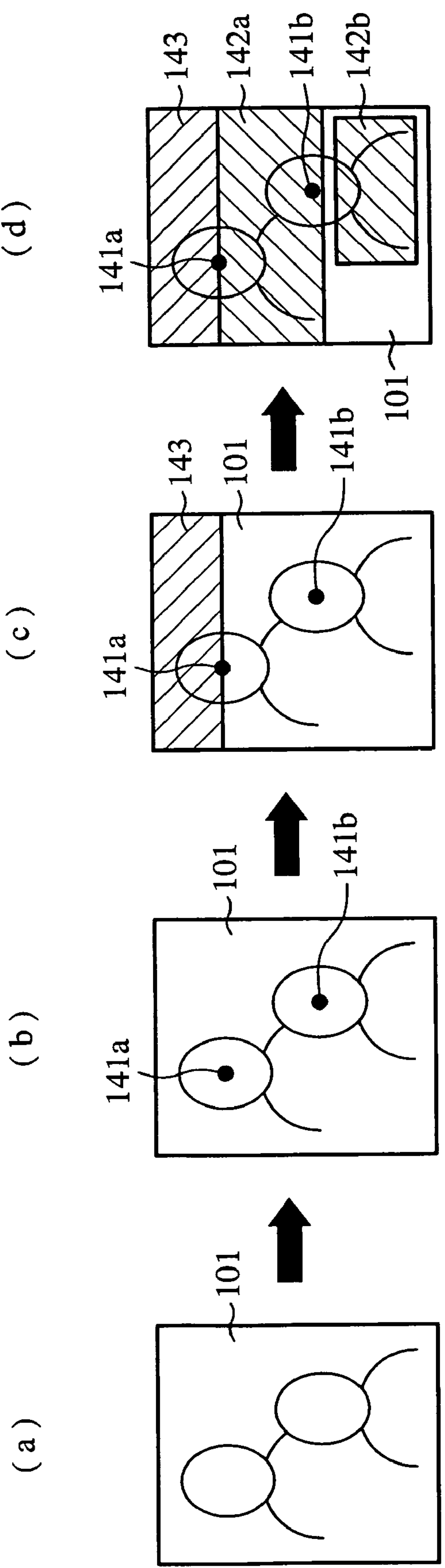
FIG. 7 is a conceptual diagram for explaining another example of the processing carried out by the information processing apparatus in accordance with embodiment 1 of the present invention which is the embedding side.

FIG. 7 is a conceptual diagram for explaining another example of the processing carried out by the information processing apparatus 10 which is the embedding side. This example differs from that of FIG. 5 in that after the first and second point of interests 141*a* and 141*b* are specified and the two pieces of related information on them are inputted, the embedding region 143 for the region management information 108, the embedding region 142*a* for the additional information 106 on the first point of interest 141*a*, and the embedding region 142*b* for the additional information 106 on the second point of interest 141*b* are allocated so that they dot not overlap one another, and the region management information, and the two pieces of additional information on the first and second point of interests are embedded into the corresponding embedding regions, respectively. If the embedding region 143 can be specified, as in the case of FIG. 5, it is not necessary to necessarily place the embedding region at the upper left corner of the original digital input image 101, unlike the case as shown in FIG. 7, and it is not necessary to place the embedding region 143 prior to the placement of the embedding regions 142*a* and 142*b*.

Figure 8:
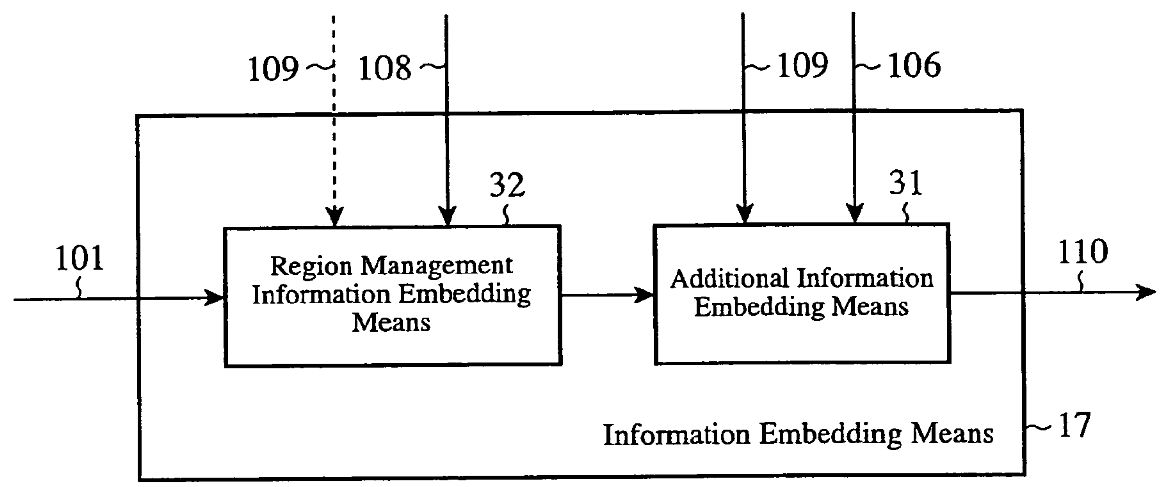
FIG. 8 is a block diagram showing the internal structure of the information embedding means of the information processing apparatus in accordance with embodiment 1 of the present invention which is the embedding side.

FIG. 8 is a block diagram showing the internal structure of the information embedding means 17. This information embedding means 17 is provided with a region management information embedding means 32 and an additional information embedding means 31, and is so constructed as to embed the additional information 106 on each point of interest in the corresponding embedding region after embedding the region management information 108 into the corresponding embedding region. Because the embedding region 143 and embedding regions 142*a* and 142*b* are allocated so that they do not overlap one another in the example shown in FIG. 7, the information embedding means 17 can have an internal structure which is shown in FIG. 6 or 8 in detail. In FIG. 8, the region information 109 inputted to the region management information embedding means 32 is outputted from the embedding region allocating means 16 in the case in which the region management information 108 is not embedded in the predetermined region.

In any of the examples shown in FIGS. 5 and 7, in the case in which the region management information 108 is not embedded in the predetermined region, and the region information 109 indicating the embedding region 143 for the region management information 108 outputted by the embedding region allocating means 16 is encrypted, the information processing apparatus can make the user perform an input of a keyword, an ID, or the like to simply hide and incorporate the region information 109 into the input value. Furthermore, the information processing apparatus can use the input value as a cryptographic key so that the embedding region 143 for the region management information 108 can be kept from being correctly known without the use of the cryptographic key, and the embedding regions 142*a* and 142*b* for the additional information 106 on the two point of interests which can be detected later cannot be acquired correctly. In this case, the detection and separation of the image, region management information 108, and additional information 106 can be made to become difficult. After the key is determined, the region information 109 can be acquired and embedded in the corresponding embedding region. As an alternative, the key can be determined from the region information 109 which is previously embedded in the corresponding embedding region.

Figure 9:
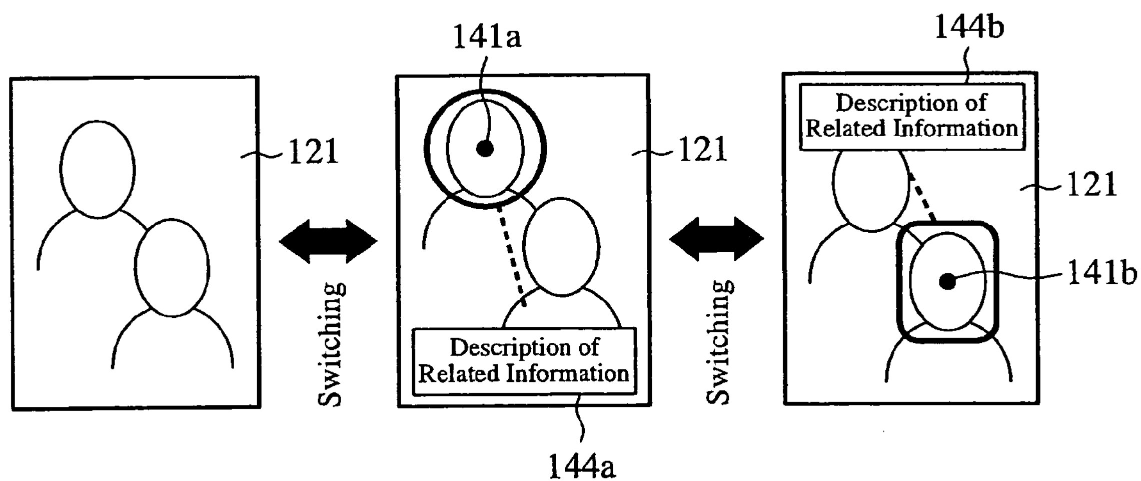
FIG. 9 is a conceptual diagram for explaining an example of processing carried out by the information processing apparatus in accordance with embodiment 1 of the present invention which is the detection side.

FIG. 9 is a conceptual diagram explaining an example of processing carried out by the information processing apparatus 20 which is the detection side. In this example, it is assumed that there are restrictions that the display screen of the image display means 22 of the information processing apparatus 20 which is the detection side is small, and related information is displayed so that it is superimposed on two persons who are objects to be shot. The information detection means 21 extracts the region management information 108 from the predetermined region of the watermarked image 110, and the embedding region allocating means 23 determines the region information 109 from the amount 107 of additional information included in the region management information 108, and, in a case in which the coordinate information 103 on each point of interest is included in the region management information 108, also outputs the coordinate information 103 on each point of interest.

As shown in FIG. 9(*a*), the information processing apparatus 20 displays the digitized output image 121 outputted from the information detection means 21 on the image display means 22. When the user specifies a point of interest through the point of interest display switching means 28, the embedding region allocating means 23 outputs the region information 109 on the specified point of interest to the information detection means 21. The information detection means 21 extracts the additional information 106 from the watermarked image 110 using the region information 109, and outputs the additional information 106. The additional information reverse conversion means 24 carries out reverse conversion of the additional information 106, and, in a case in which the text 105 of the related information and mark information 104 are included in the additional information 106, outputs the mark information 104, or, in a case in which the coordinate information 103 on the point of interest is included in the additional information 106, outputs the coordinate information 103 on the point of interest.

In a case in which the coordinate information 103 on the point of interest from either the embedding region allocating means 23 or the additional information reverse conversion means 24 and mark information 104 are included in the additional information 106, the point of interest display means 25 displays the first point of interest 141*a* on the digitized output image 121 currently displayed on the image display means 22, as shown in the FIG. 9(*b*), on the basis of the mark information 104 from the additional information reverse conversion means 24. At that time, the first point of interest 141*a* is represented by a point at the position specified by the coordinate information 103, or is represented by a mark based on the mark information 104, for example, a circle having a center at the position specified by, for example, the coordinate information 103 on the point of interest. The related information display means 26 displays the text 105 of the related information in the form of a description 144*a* of the related information on the digitized output image 121 currently displayed on the image display means 22 so that it does not overlap the position of the display of the first point of interest 141*a*, as shown in FIG. 9(*b*), on the basis of the display position information 123 determined by the display position determining means 27.

When the user specifies the next point of interest through the point of interest display switching means 28, the information processing apparatus 20 carries out similar processing, and displays the second point of interest 141*b* with a mark such as a point or a quadrangle, as shown in FIG. 9(*c*), and also displays the text 105 of the related information on the second point of interest 141*b* in the form of a description 144*b* of the related information so that it does not overlap the second point of interest 141*b*.

In the following processing, every time when the user specifies a point of interest, each component shown in FIG. 2 carries out its processing. As an alternative, each component shown in FIG. 2 can carry out its processing which it has to do before displaying a specified point of interest 141 and a description 144 of related information on the digitized output image 121 without waiting for an instruction from the user, and, after receiving the instruction from the user, can display the point of interest 141 and the description 144 of related information.

When the user performs a forward switching by manipulating a specific button or the like, or when the user places a cursor in the vicinity of a point of interest or in a mark indicating a point of interest and manipulates a specific button, the point of interest display switching means 28 selects the point of interest as the point of interest to be displayed. The specified point of interest 141 and description 144 of related information do not necessarily need to be displayed simultaneously, and they can be alternately displayed one by one according to manipulation of a button by the user. As an alternative, after a point of interest 141 currently being displayed is selected, a corresponding description 144 of related information can be displayed.

Each point of interest 141 indicated by mark information can be completely independent from the display position of a corresponding description 144 of related information. In other words, each point of interest 141 indicated by mark information does not necessarily depend upon the display position of a corresponding description 144 of related information. In a case in which a relation between each point of interest 141 and a corresponding description 144 of related information is not easy to identify, the relation can be expressed by, for example, a line showing the correspondence between them, as shown in FIGS. 9(*b*) and 9(*c*).

Figure 10:
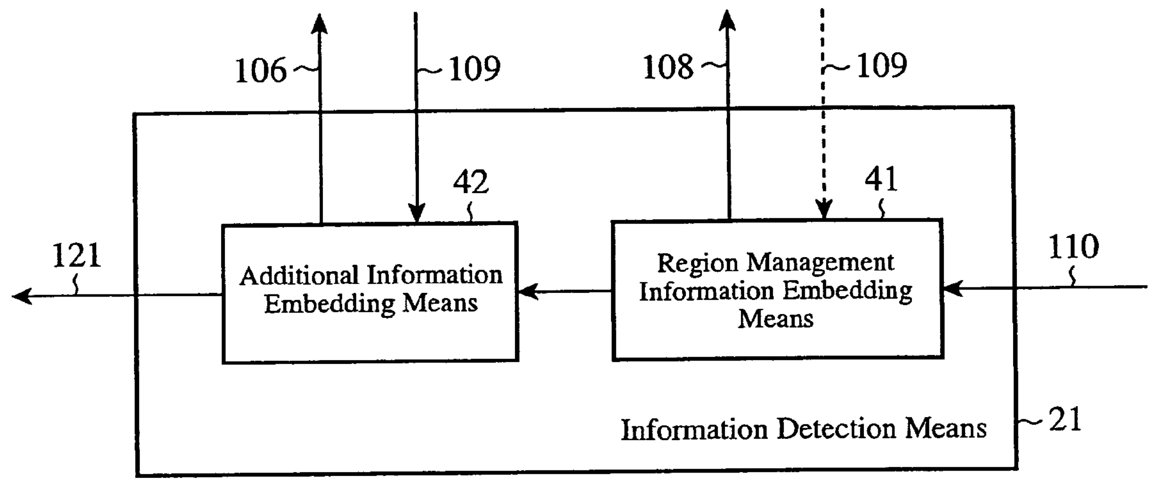
FIG. 10 is a block diagram showing the internal structure of an information detecting means of the information processing apparatus in accordance with embodiment 1 of the present invention which is the detection side.

FIG. 10 is a block diagram showing the internal structure of the information detection means 21 of the information processing apparatus 20 which is the detection side. This information detection means 21 is provided with a region management information extraction means 41 and an additional information extracting means 42, and is so constructed that the region management information extraction means 41 extracts the region management information 108 first and the additional information extracting means 42 then extracts the additional information 106 with the region information 109. In FIG. 10, the region information 109 inputted to the region management information extraction means 41 is outputted from the embedding region allocating means 23 in the case in which the region management information 108 is not embedded in the predetermined region.

Figure 11:
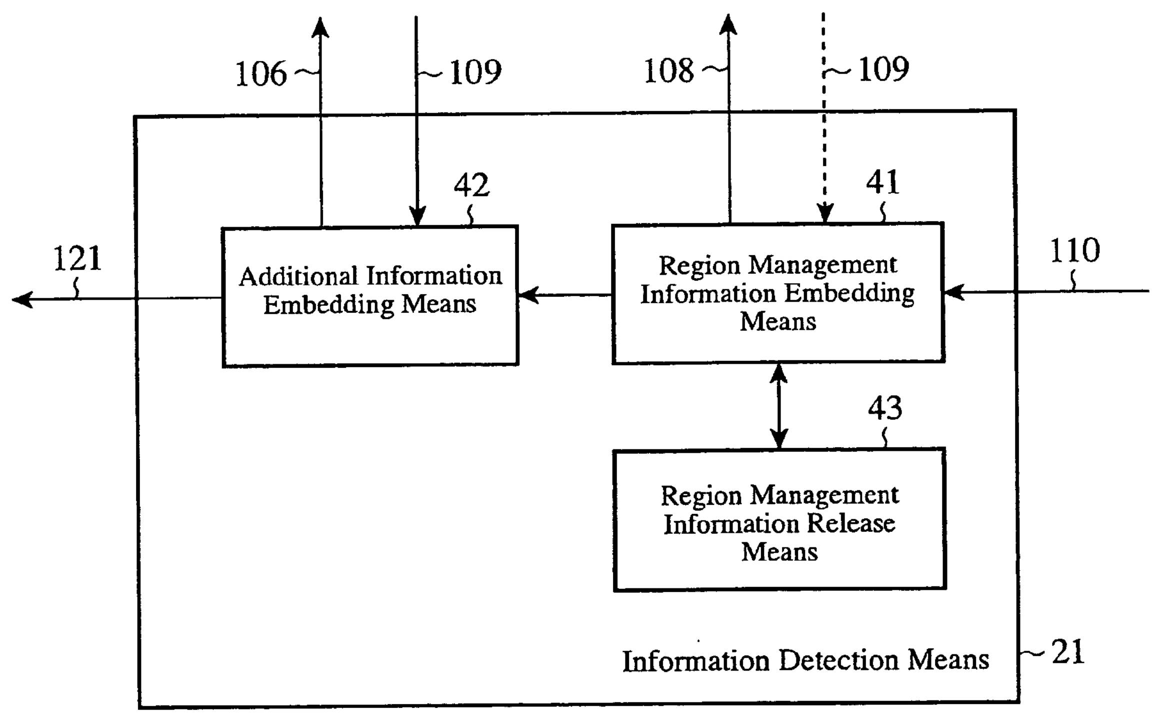
FIG. 11 is a block diagram showing the internal structure of the information detecting means of the information processing apparatus in accordance with embodiment 1 of the present invention which is the detection side.

FIG. 11 is a block diagram showing the internal structure of the information detection means 21 of the information processing apparatus 20 which is the detection side. This information detection means 21 is provided with a region management information extraction means 41, an additional information extracting means 42, and a region management information release means 43. After the region management information extraction means 41 extracts the region management information 108 embedded in the watermarked image 110 and outputs it to the embedding region allocating means 23, the region management information release means 43 releases the region management information 108 embedded in the watermarked image 110.

As shown in FIG. 5, in a case in which the embedding region 143 for the region management information 108 overlaps an embedding region 142 for additional information 106, a reversible electronic watermark is applied for embedding in the embedding region 143 region (C), and the region management information release means 43 of FIG. 11 releases the region management information 108. As a result, the number of times of application of an electronic watermark embedded into an identical position can be reduced, degradation in the quality of the displayed image can be reduced, and restrictions on detection by means of the electronic watermark technique applied to embedding of the next additional information 106 can be also reduced. This method is effective even in a case in which the embedding region 143 for the region management information 108 does not overlap any embedding region 142 for additional information 106.

Figure 12:
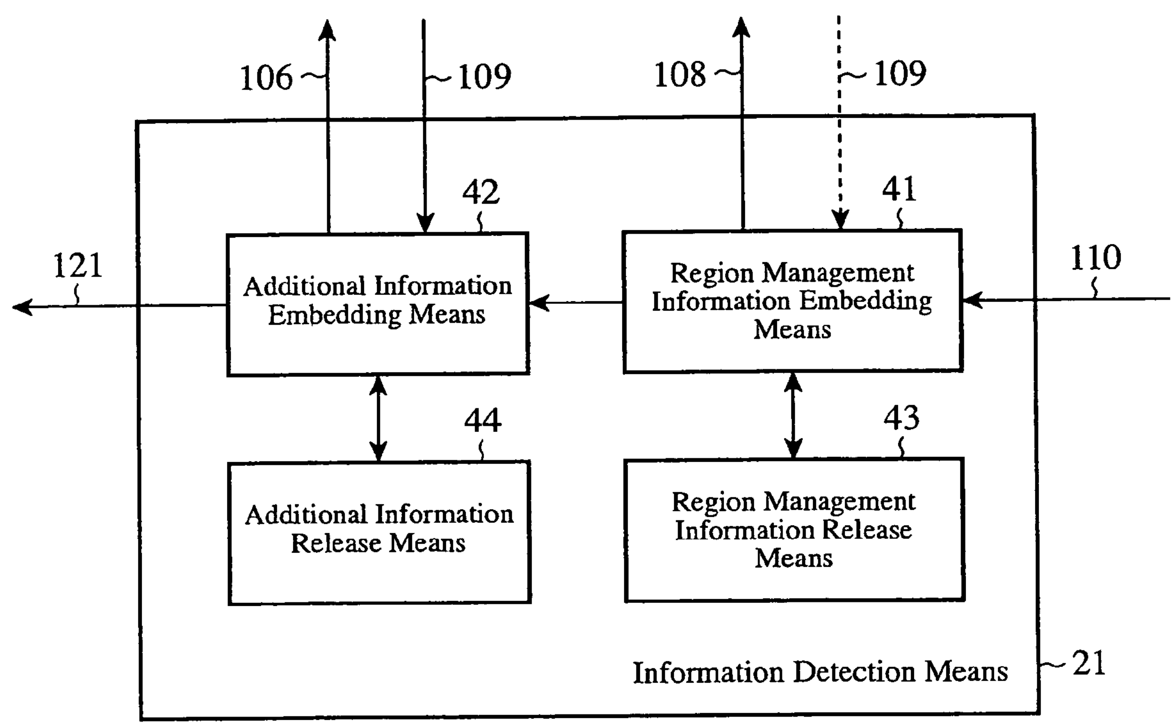
FIG. 12 is a block diagram showing the internal structure of the information detecting means of the information processing apparatus in accordance with embodiment 1 of the present invention which is the detection side.

FIG. 12 is a block diagram showing the internal structure of the information detection means 21 of the information processing apparatus 20 which is the detection side. This information detection means 21 is provided with a region management information extraction means 41, an additional information extracting means 42, a region management information release means 43, and an additional information release means 44. After the additional information extracting means 42 extracts each additional information 106 embedded in the watermarked image 110 and outputs it to the additional information reverse conversion means 24, the additional information release means 44 releases each additional information 106 embedded in the watermarked image 110.

A reversible electronic watermark can be also applied to the embedding region 142 for the additional information 106, and the additional information release means 44 shown in FIG. 12 can release the additional information 106. In this case, the degradation in the quality of the displayed image can be further reduced. As shown in FIG. 12, the information detection means 21 additionally includes the region management information release means 43 and additional information release means 44. As an alternative, the information detection means 21 can additionally include only the additional information release means 44.

An electronic watermark is fundamentally accompanied by only image quality degradation having such a degree that human beings cannot sense with their eyes, except for a case in which a large degree of degradation is intentionally introduced into the watermarked image. Therefore, by applying a reversible electronic watermark method to both the embedding region 143 for the region management information 108 and the embedding region 142 for the additional information 106, and by providing the region management information release means 43 and additional information release means 44 with the information detection means 21, as shown in FIG. 12, the digitized output image 121 can be displayed with quality which is just the same as that of the original digital input image 101. However, even in the case in which the information detection means 21 additionally includes the region management information release means 43 and additional information release means 44, the information processing apparatus 20 can temporarily display the digitized output image 121 in which the electronic watermark is embedded on the image display means 22, juts as it is, until it can display the digitized output image 121 in which the electronic watermark is released.

It is desirable that the information processing apparatus 20 which is the detection side takes protective measures toward protection of a copyright of the image data independently when outputting the digitized output image 121 in which the electronic watermark is released to outside the information processing apparatus 20. It is similarly desirable to take protective measures toward protection of a copyright of digital sound data included in the image data by means of the electronic watermark or the like.

As mentioned above, in accordance with this embodiment 1, the embedding region allocating means 16 of the information processing apparatus 10 which is the embedding side and the embedding region allocating means 23 of the information processing apparatus 20 which is the detection side can allocate an embedding region having an optimal size or can allocate an embedding region having a minimum degree of redundancy on the basis of an amount 107 of additional information by only enabling the user to specify a point of interest without allowing the user to directly participate in the allocation of the embedding region. Therefore, the present embodiment offers an advantage of being able to embed additional information 106 into the whole image region efficiently, thereby being able to show only an intended region of interest effectively.

Furthermore, in accordance with this embodiment 1, the embedding region allocating means 16 of the information processing apparatus 10 which is the embedding side and the embedding region allocating means 23 of the information processing apparatus 20 which is the detection side can share the region management information 108 and the region information 109 indicating the embedding location for the additional information 106 between them by embedding the coordinate information 103 on each point of interest and the amount 107 of additional information specifying the size of a related region by means of the electronic watermarking method without specifying the position or shape of the embedding region directly by means of the electronic watermarking method, and transmitting them between them, and can distribute the region information 109 common to both of them by using the same algorithm. Therefore, the present embodiment offers another advantage of being able to, in a case in which the algorithm of determining the region information 109 is not known, prevent the region information 109 which is actually used from being distributed even if the coordinate information 103 and the amount 107 of additional information on each point of interest are decrypted, thereby ensuring the security of the related information embedded in the image.

Furthermore, in accordance with this embodiment 1, the embedding region for the additional information 106 which the embedding region allocating means 16 of the information processing apparatus 10 which is the embedding side and the embedding region allocating means 23 of the information processing apparatus 20 which is the detection side allocates to each point of interest has a simple shape, such as a rectangle or a circle. Therefore, the present embodiment offers an advantage of being able to allocate the embedding region for each point of interest independently upon the position of each point of interest, thereby improving the flexibility of the allocation of the embedding region to each point of interest.

In addition, in accordance with this embodiment 1, the point of interest display means 25 of the information processing apparatus 20 which is the detection side displays each point of interest using a mark. Therefore, the present embodiment offers a further advantage of being able to make it possible for the user of the embedding side to certainly inform the user on the detection side of an intended point of interest independently upon the embedding region for the additional information 106.

Furthermore, while conventionally, a region of interest and an embedding region for related information are united and therefore the distinction between them becomes blurry in a state in which the region of interest cannot but be enlarged superfluously, the information processing apparatus 20 in accordance with this embodiment 1 which is the detection side can certainly inform the user of an intended point of interest 141 by separately displaying each point of interest 141 and a corresponding description 144 of related information, as shown in FIG. 9.

In addition, the display position determining means 27 of the information processing apparatus 20 in accordance with this embodiment 1 which is the detection side can determine an optimal display position of the related information so that the related information does not hide the vicinity of the corresponding point of interest by referring to the coordinate information 103 on the corresponding point of interest and the number of characters of the text 105 of the related information in advance even under the constraint that the related information cannot but be superimposed on the currently-displayed image.

Embodiment 2

In accordance with above-mentioned embodiment 1, no special control of the total of the amount 107 of additional information which is embedded into the image by means of an electronic watermarking method is performed. In contrast, in accordance with this embodiment 2, the total of the amount 107 of additional information is controlled.

Figure 13:
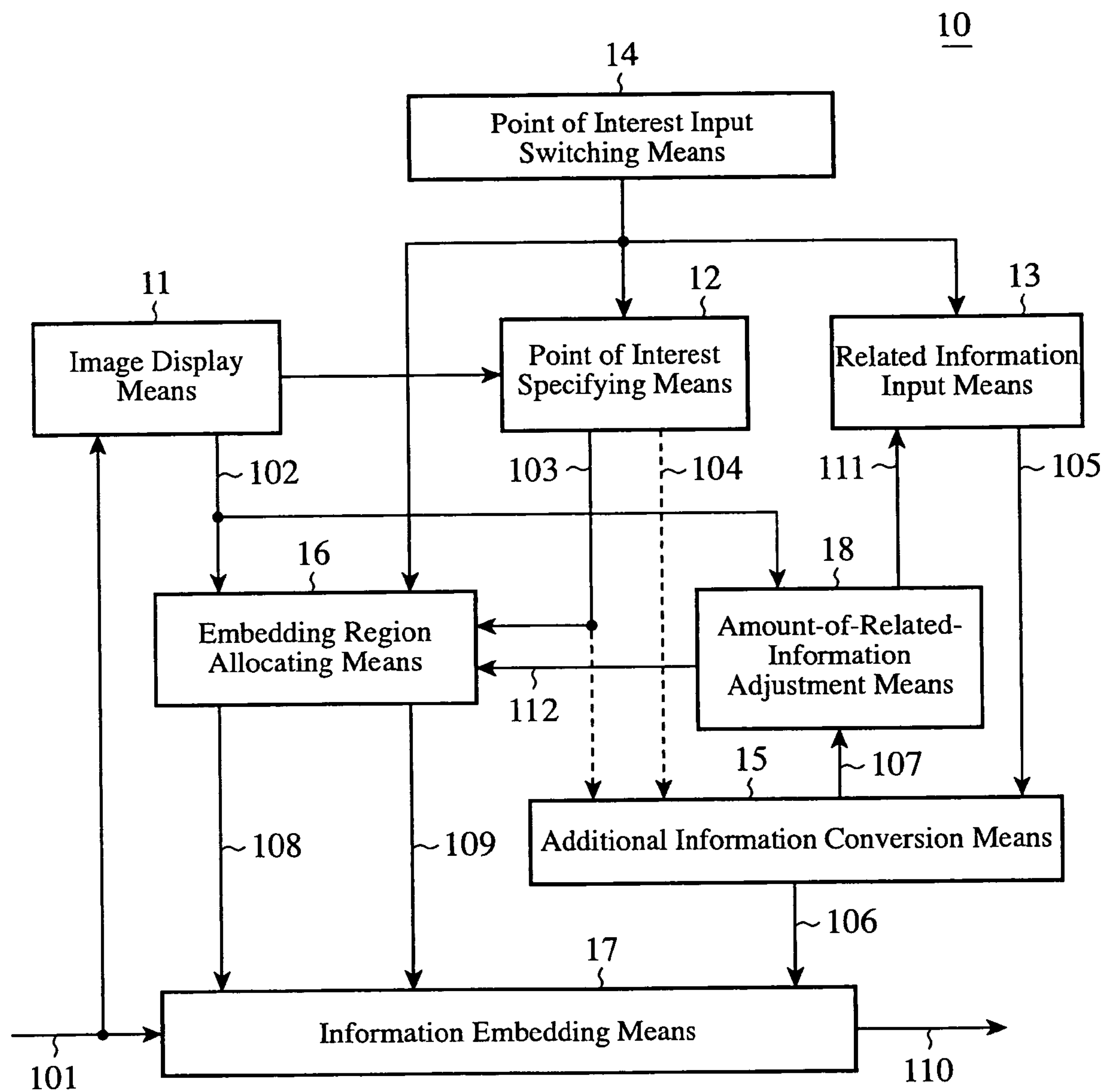
FIG. 13 is a block diagram showing the structure of an information processing apparatus in accordance with embodiment 2 of the present invention which is an embedding side.

FIG. 13 is a block diagram showing the structure of information processing apparatus 10 in accordance with embodiment 2 of the present invention which is an embedding side. This information processing apparatus 10 which is the embedding side includes a related information amount adjustment means 18 in addition to the components of the information processing apparatus 10, as shown in FIG. 1 of above-mentioned embodiment 1, which is the embedding side, and the other components of the information processing apparatus 10 of this embodiment are the same as those shown in FIG. 1.

Next, the operation of the information processing apparatus 10 which is the embedding side will be explained.

The related information amount adjustment means 18 grasps a total amount of additional information to be embedded in the image on the basis of image size information 102 outputted from an image display means 11 first, accepts an amount 107 of additional information on each point of interest which an additional information conversion means 15 outputs, outputs an amount 111 of remaining additional information which can be additionally embedded in the original digital input image 101 to a related information input means 13, and outputs a determined amount 112 of additional information to an embedding region allocating means 16.

The related information input means 13 determines the amount of related information inputted from the user so that it is equal to or less than the amount 111 of remaining additional information outputted from the related information amount adjustment means 18 to generate and output a text 105 of related information. The embedding region allocating means 16 accepts the determined amount 112 of additional information from the related information amount adjustment means 18, and then carries out the same processing as explained in above-mentioned embodiment 1. The other processing is the same as that explained in above-mentioned embodiment 1.

As can be seen from the above description, this embodiment 2 provides the same advantages as offered by above-mentioned embodiment 1. Furthermore, even when the size of the original digital input image 101 is not sufficiently large and therefore the total amount of additional information 106 to be embedded is restricted, the related information amount adjustment means 18 can make a request of the user to input related information having an amount commensurate with the amount 111 of remaining additional information by always outputting the amount 111 of remaining additional information which can be additionally embedded in the original digital input image 101 to the related information input means 13 so as to control the whole amount 107 of additional information.

Embodiment 3

In above-mentioned embodiment 1, the information processing apparatus 20 which is the detection side determines the position of display of related information from the watermarked image 110. In contrast, in accordance with this embodiment 3, the information processing apparatus 10 which is the embedding side determines the position of display of the related information, and embeds it, as a part of additional information 106, in the image.

Figure 14:
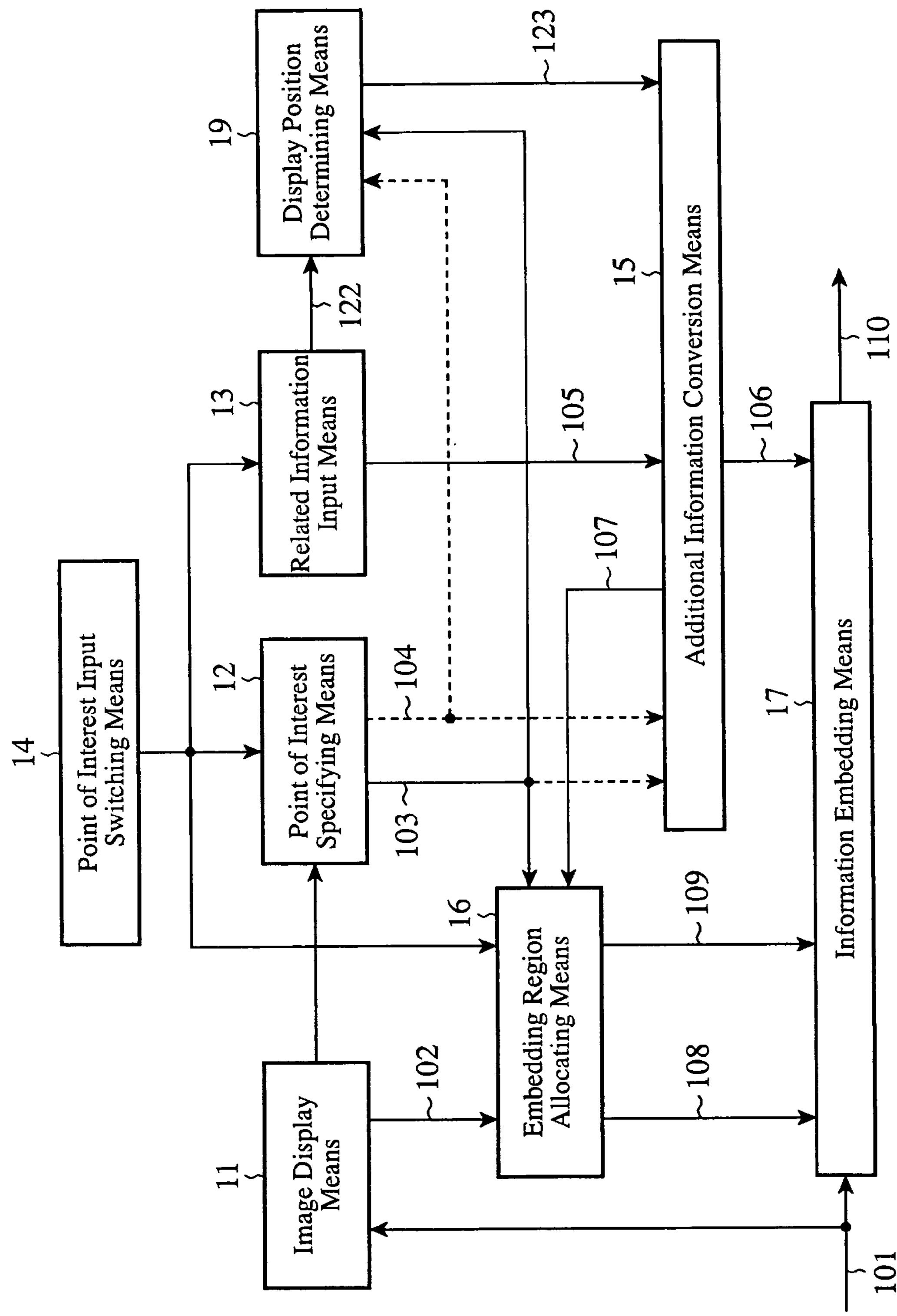
FIG. 14 is a block diagram showing the structure of an information processing apparatus in accordance with embodiment 3 of the present invention which is an embedding side.

FIG. 14 is a block diagram showing the structure of the information processing apparatus 10 which is the embedding side in accordance with embodiment 3 of the present invention. This information processing apparatus 10 which is the embedding side includes a display position determining means 19 in addition to the components of the information processing apparatus 10, as shown in FIG. 1 of above-mentioned embodiment 1, which is the embedding side, and the other components of the information processing apparatus 10 of this embodiment are the same as those shown in FIG. 1.

Next, the operation of the information processing apparatus 10 which is the embedding side will be explained.

The related information input means 13 accepts related information related to each point of interest, and outputs a text 105 of the related information and also outputs the number 122 of characters included in the text 105. For each point of interest, the display position determining means 19 determines an optimal position of display of the related information which does not hide each point of interest on the basis of coordinate information 103 on each point of interest outputted from the point of interest specifying means 12, mark information 104 on each point of interest if needed, and the number 122 of characters included in the text 105 of the related information outputted from the related information input means 13, and outputs, as one element of additional information 106, display position information 123 on the determined optimal position of display of the related information to the additional information conversion means 15.

The display position determining means 19 shown in FIG. 14 can produce the display position information 123 on the basis of the same method as that of the display position determining means 27 shown in FIG. 2 of above-mentioned embodiment 1. The display position information 123 produced by the display position determining means 19 can include not only the information on the optimal position which does not hide each point of interest and corresponding mark information 104, but also information on fine adjustments permitted for the user and information on an intention of the user, such as making the display of the related information not hide a part of another background image.

Figure 15:
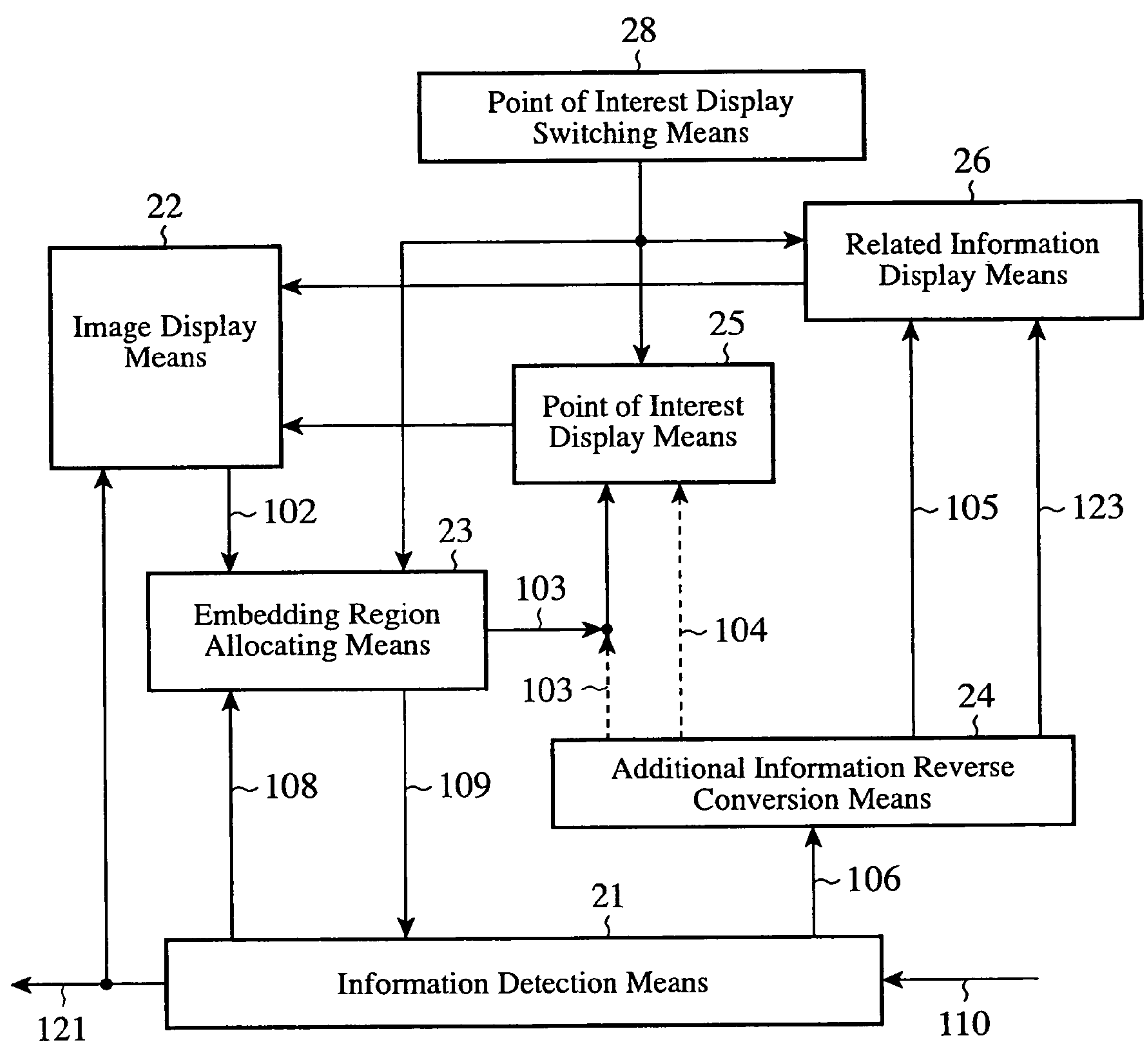
FIG. 15 is a block diagram showing the structure of an information processing apparatus in accordance with embodiment 3 of the present invention which is a detection side.

FIG. 15 is a block diagram showing the structure of the information processing apparatus 20 which is the detection side in accordance with embodiment 3 of the present invention. This information processing apparatus 20 which is the detection side is the same as the information processing apparatus 20 which is the detection side, as shown in FIG. 2 of above-mentioned embodiment 1, with the exception that the information processing apparatus 20 of this embodiment 3 does not include the display position determining means 27, and the other components of the information processing apparatus 20 of this embodiment are the same as those shown in FIG. 2.

Next, the operation of the information processing apparatus 20 which is the detection side will be explained.

The additional information reverse conversion means 24 detects, as a part of the additional information 106 of each point of interest acquired from the information detection means 21, the display position information 123, and then outputs it to the related information display means 26. Processes performed by the other components are the same as those of above-mentioned embodiment 1.

FIG. 16 is a diagram showing examples of the format of the additional information 106 in a case in which the coordinate information 103 on each point of interest is included in the region management information 108. In FIG. 16(*a*), display position information 123*a* on related information on a first point of interest, a text 105*a* of the related information on the first point of interest, display position information 123*b* on related information on a second point of interest, and a text 105*b* of the related information on the second point of interest are included in the additional information 106. In FIG. 16(*b*), the display position information 123*a* on the related information on the first point of interest, mark information 104*a* on the first point of interest, text 105*a* of the related information on the first point of interest, display position information 123*b* on the related information on the second point of interest, mark information 104*b* on the second point of interest, and text 105*b* of the related information on the second point of interest are included in the additional information 106. The format of the region management information 108 in these cases has the same examples as shown in FIGS. 3(*a*) and 3(*b*) of above-mentioned embodiment 1.

FIG. 17 is a diagram showing examples of the format of the additional information 106 in a case in which the coordinate information 103 on each point of interest is included in the additional information 106. In FIG. 17(*a*), the coordinate information 103*a* on the first point of interest, display position information 123*a* on the related information on the first point of interest, text 105*a* of the related information on the first point of interest, coordinate information 103*b* on the second point of interest, display position information 123*b* on the related information on the second point of interest, and text 105*b* of the related information on the second point of interest are included in the additional information 106.

In FIG. 17(*b*), the coordinate information 103*a* on the first point of interest, display position information 123*a* on the related information on the first point of interest, mark information 104*a* on the first point of interest, text 105*a* of the related information on the first point of interest, coordinate information 103*b* on the second point of interest, display position information 123*b* on the related information on the second point of interest, mark information 104*b* on the second point of interest, and text 105*b* of the related information on the second point of interest are included in the additional information 106. The format of the region management information 108 in these cases has the same examples as shown in FIGS. 4(*a*) and 4(*b*) of above-mentioned embodiment 1.

In the format of the additional information 106 which are shown in FIGS. 16 and 17, the order of the display position information 123 on the related information on each point of interest, mark information 104 on each point of interest, text of the related information on each point of interest, and so on are not limited to the examples shown in the figures. In the format, the data fields can be interchanged.

FIG. 18 is a diagram showing examples of the format of the region management information 108 in a case in which only the text 105 of the related information on each point of interest is included in the additional information 106. In this case, the additional information 106 has a format as shown in FIG. 3(*c*) of above-mentioned embodiment 1. FIG. 18(*a*) shows a format in which a plurality of data fields are successively arranged for each point of interest, and FIG. 18(*b*) shows a format which data on a plurality of point of interest are successively arranged for each data field. The arrangement as shown in FIG. 18(*b*) can be applied to the examples of the format of the region management information 108 as shown in FIGS. 3(*a*) and 3(*b*) of above-mentioned embodiment 1.

In this case, the additional information conversion means 15 of FIG. 14 accepts only the text 105 of the related information, and converts it into additional information 106. The coordinate information 103 and mark information 104 on each point of interest other than the text 105 of the related information are inputted to the embedding region allocating means 16, and are added to the region management information 108. The additional information reverse conversion means 24 of FIG. 15 extracts and outputs only the text 105 of the related information from the additional information 106, and the embedding region allocating means 23 extracts and outputs the coordinate information 103 and mark information 104 on each point of interest from the region management information 108.

FIG. 19 is a diagram showing an example of the format of the additional information 106 in which a plurality of data fields are successively arranged for each point of interest. In the example, the format of the additional information 106 shown in FIG. 17(*b*) is the one in which a plurality of data fields are successively arranged for each point of interest, as in the case of FIG. 18(*b*).

The example of the format of the region management information 108 shown in FIG. 18 and the example of the format of the additional information 106 shown in FIG. 19 can be also applied to the information processing apparatus shown in above-mentioned embodiments 1 and 2, and an information processing apparatus shown in below-mentioned embodiment 4. In the examples shown in FIGS. 18 and 19, the number of data fields shown in FIG. 3 and FIG. 4 of above-mentioned embodiment 1 is maximized. This concept can be also applied to the other examples.

Figure 20:
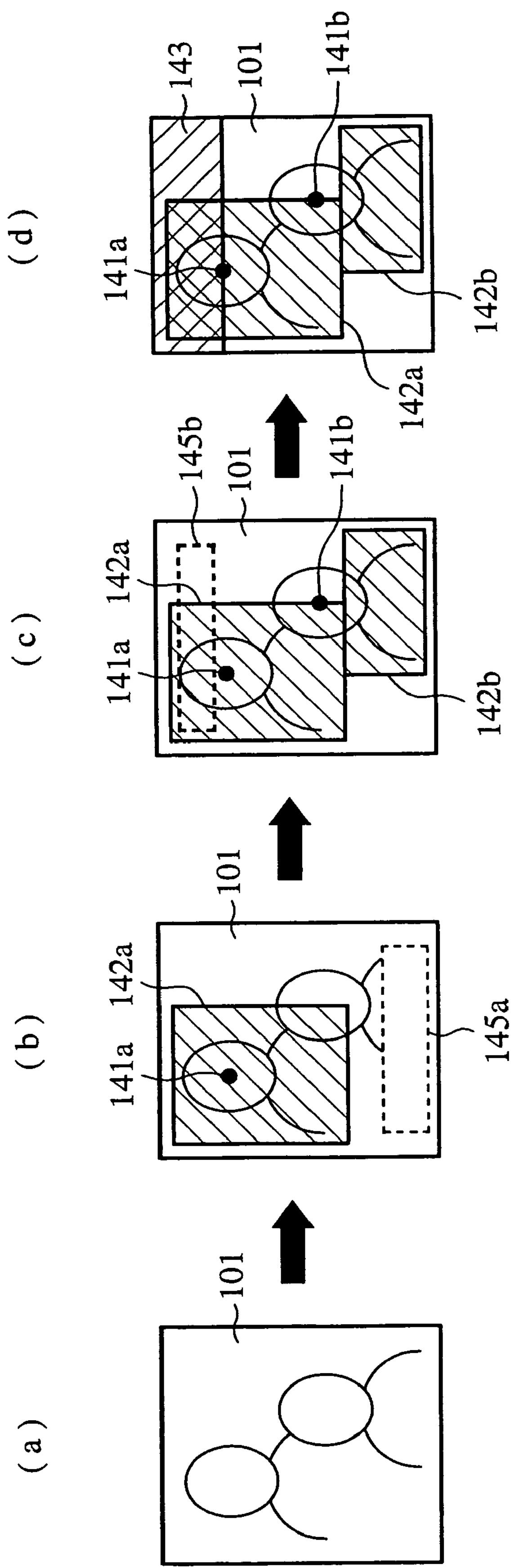
FIG. 20 is a conceptual diagram for explaining an example of processing performed by the information processing apparatus in accordance with embodiment 3 of the present invention which is the embedding side.

FIG. 20 is a conceptual diagram for explaining an example of processing performed by the information processing apparatus 10 which is the embedding side. This example will be explained assuming that the original digital input image 101 is an image in which two persons are captured as objects to be shot, as shown in FIG. 5 of embodiment 1. As shown in FIG. 5(*b*), a first point of interest 141*a* for a first object is specified according to the user's input from the point of interest specifying means 12, and the related information associated with the first point of interest 141*a* is inputted through the user's input from the related information input means 13. At that time, the mark information 104 including the shape and size of a mark indicating the first point of interest 141*a* can be simultaneously inputted through the point of interest specifying means 12.

The display position determining means 19 then determines an optimal position 145*a* of display of the related information which does not hide the point of interest 141*a* on the basis of coordinate information 103 on the point of interest 141*a* outputted from the point of interest specifying means 12, mark information 104 on the point of interest if needed, and the number 122 of characters included in the text 105 of the related information outputted from the related information input means 13, and outputs, as one element of additional information 106, display position information 123 on the determined optimal position of display of the related information to the additional information conversion means 15. The information embedding means 17 then embeds the additional information 106 in an embedding region 142*a* outputted as region information 109, as in the case of FIG. 5(*b*) of above-mentioned embodiment 1.

Next, as shown in FIG. 20(*c*), a second point of interest 141*b*, which is a second object, and an optimal position 145*b* of display of the related information which does not hide the point of interest 141*b* are determined according to the same procedure, mark information 104 on the second point of interest is inputted, an embedding region 142*b* for the additional information on the second point of interest is allocated and the additional information 106 is embedded in the embedding region 142*b*. Finally, as shown in FIG. 20(*d*), the information embedding means 17 embeds the region management information 108 in an embedding region 143, as in the case of FIG. 5(*d*) of above-mentioned embodiment 1.

Figure 21:
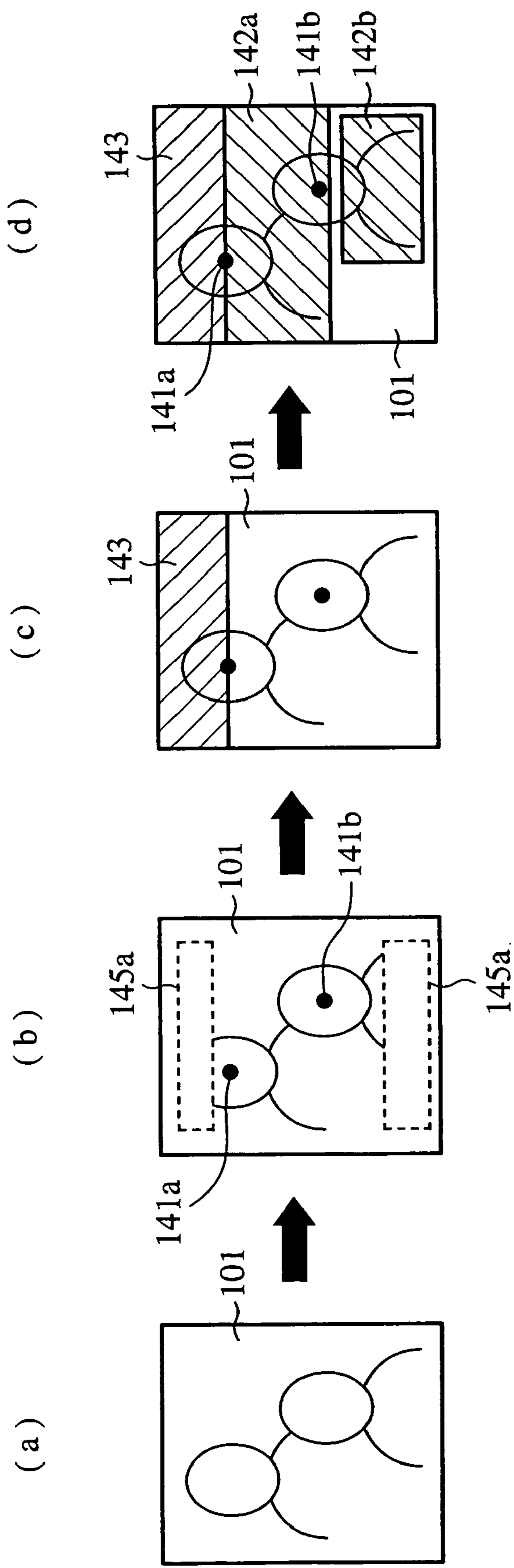
FIG. 21 is a conceptual diagram for explaining another example of the processing performed by the information processing apparatus in accordance with embodiment 3 of the present invention which is the embedding side.

FIG. 21 is a conceptual diagram for explaining another example of the processing performed by the information processing apparatus 10 which is the embedding side. This example differs from that of FIG. 20 in that, as shown in FIG. 21(*b*), after the first and second point of interests 141*a* and 141*b* are specified and at least the optimal positions 145*a* and 145*b* of display of the two pieces of related information are determined, the embedding region 143 for the region management information 108, the embedding region 142*a* for the additional information 106 on the first point of interest 141*a*, and the embedding region 142*b* for the additional information 106 on the second point of interest 141*b* are allocated so that they dot not overlap one another, and the region management information, and the two pieces of additional information on the first and second point of interests are embedded into the corresponding embedding regions, respectively, as shown in FIGS. 21(*c*) and 21(*d*). If the embedding region 143 can be specified, as in the case of FIG. 20, it is not necessary to necessarily place the embedding region at the upper left corner of the original digital input image 101, unlike the case as shown in FIG. 21, and it is not necessary to place the embedding region 143 prior to the placement of the embedding regions 142*a* and 142*b*.

As can be seen from the above description, this embodiment 3 provides the same advantages as offered by above-mentioned embodiment 1. Furthermore, because even under the constraint that the related information cannot but be superimposed on the currently-displayed image, the display position determining means 19 of the information processing apparatus 10 which is the embedding side can determine the position 145 of display of the related information on each point of interest, this embodiment 3 offers another advantage of being able to display the related information at an optimal display position to which the user has made a fine adjustment to reflect his or her intention in the display position without having to provide the information processing apparatus 20 which is the detection side with the display position determining means 27.

Embodiment 4

An information processing apparatus 10 in accordance with this embodiment 4 which is an embedding side performs both adjustment of the amount of additional information, as explained in above-mentioned embodiment 2, and determination of the display position of related information, as explained in above-mentioned embodiment 3.

Figure 22:
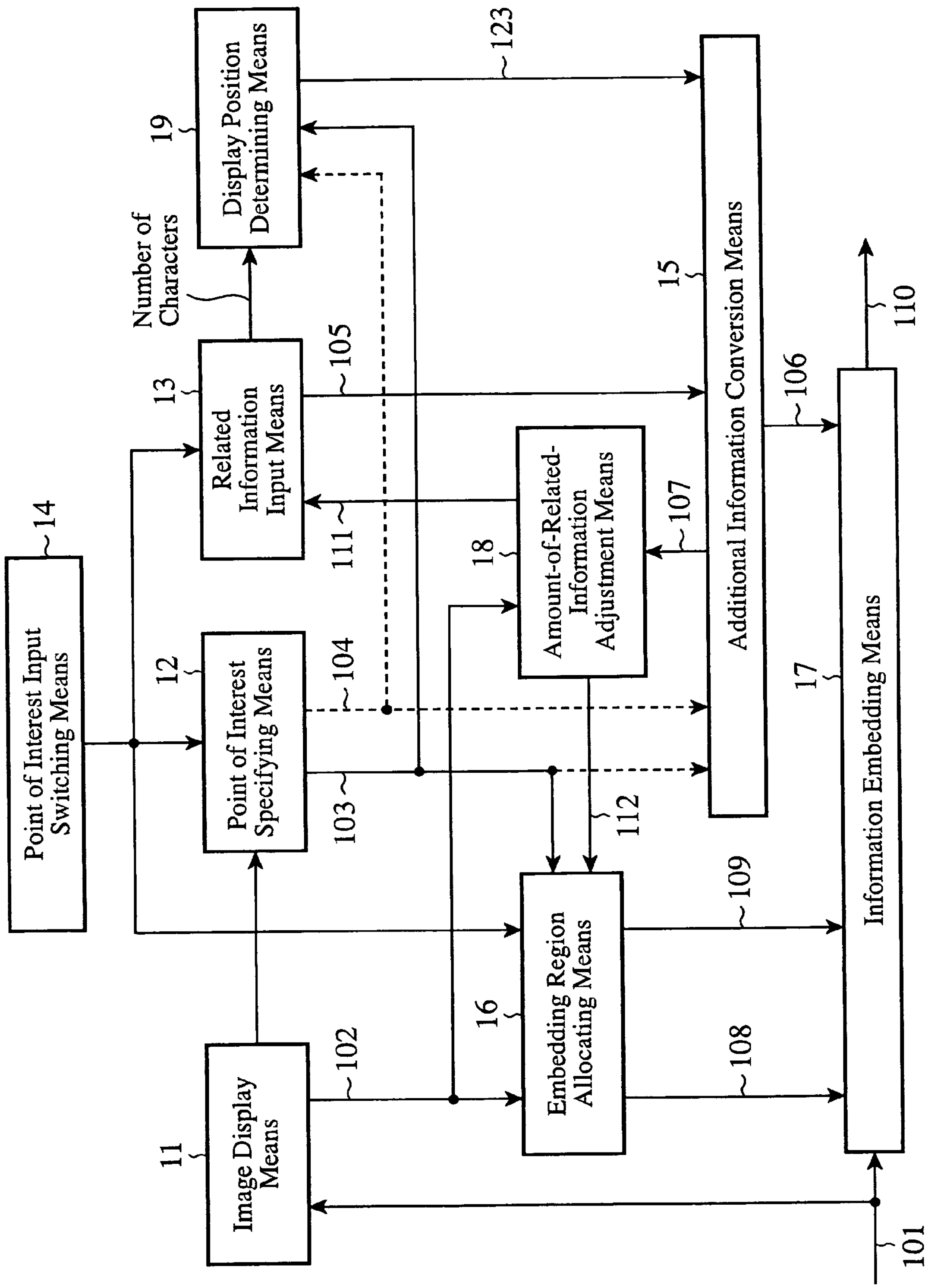
FIG. 22 is a block diagram showing the structure of information processing apparatus in accordance with embodiment 4 of the present invention which is an embedding side.

FIG. 22 is a block diagram showing the structure of information processing apparatus 10 in accordance with embodiment 4 of the present invention which is the embedding side. This information processing apparatus 10 which is the embedding side includes a related information amount adjustment means 18 in addition to the components of the information processing apparatus 10 which is the embedding side as shown in FIG. 14 of above-mentioned embodiment 3, and the other components of the information processing apparatus 10 of this embodiment are the same as those shown in FIG. 14.

Processing performed by the related information amount adjustment means 18 of the information processing apparatus 10 which is the embedding side is the same as that of above-mentioned embodiment 2, processing performed by a display position determining means 19 is the same as that of above-mentioned embodiment 3, and processes performed by the other components are the same as those of above-mentioned embodiment 1.

As mentioned above, in accordance with this embodiment 4, the same advantages as provided by above-mentioned embodiment 1 are offered, and the same advantages as provided by above-mentioned embodiments 2 and 3 can be simultaneously offered.

The information processing apparatus shown in each of above-mentioned embodiments 1 to 4 can be implemented via hardware. As an alternative, the information processing apparatus shown in each of above-mentioned embodiments 1 to 4 can be implemented via a software program which runs on a general-purpose apparatus, such as a personal computer (referred to as a PC from here on). The information processing apparatus shown in each of above-mentioned embodiments 1 to 4 can be alternatively implemented via a combination of hardware and software.

In the information processing apparatus shown in each of above-mentioned embodiments 1 to 4, the embedding region for each of the region management information 108 and the additional information 106 on each point of interest is a single region. However, it is not necessary to limit the embedding region to a single region and the shape of the embedding region is not limited to a rectangle and can be freely defined as long as the embedding region allocating means 16 and 23 can divide each embedding region into two or more subregions and carry out integrated management of the two or more subregions on the basis of the image size information 102 and the amount 107 of additional information.

In the information processing apparatus shown in each of above-mentioned embodiments 1 to 4, the electronic watermarking method which the information embedding means 17 and information detection means 21 use is not limited to the method disclosed in above-mentioned patent reference 1, and another method can be used as the electronic watermarking method.

Embodiment 5

In this embodiment 5, a digital camera in which the information processing apparatus 10 which is the embedding side, as explained in either of above-mentioned embodiments 1 to 4, is mounted will be explained.

Figure 23:
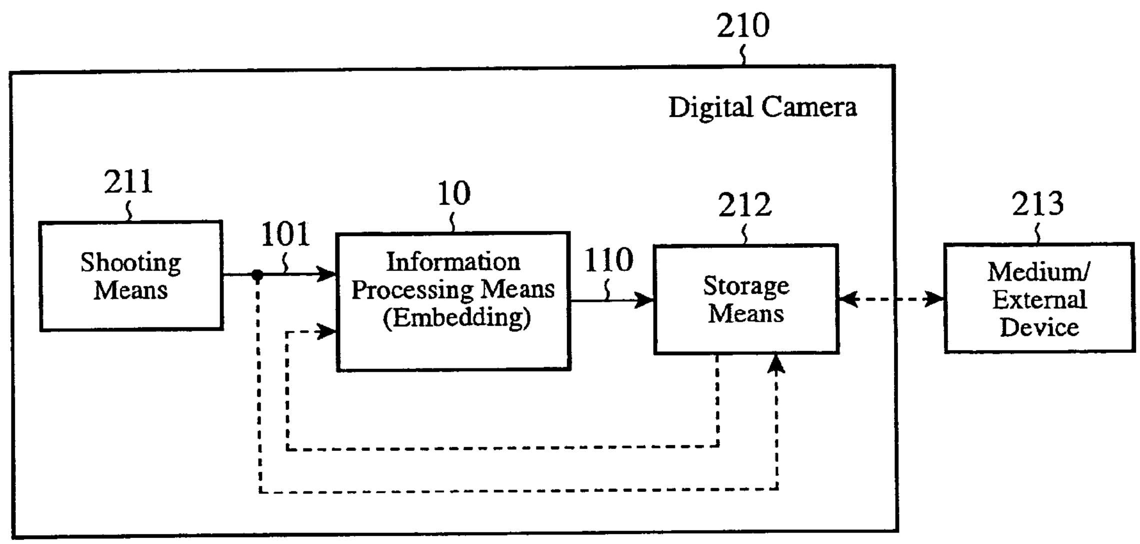
FIG. 23 is a block diagram showing the structure of a digital camera in accordance with embodiment 5 in which an information processing apparatus in accordance with the present invention which is an embedding side is mounted.

FIG. 23 is a block diagram showing the structure of the digital camera 210 in accordance with embodiment 5 in which the information processing apparatus 10 in accordance with the present invention which is the embedding side is mounted. This digital camera 210 is provided with an imaging means 211, the information processing apparatus 10 which is the embedding side, and a storage means 212.

Next, the operation of the digital camera in accordance with this embodiment of the present invention will be explained.

The imaging means 211 shoots an object to be shot to produce an image, and outputs it as an original digital input image 101. As explained in above-mentioned embodiments 1 to 4, the information processing apparatus 10 which is the embedding side embeds region management information 108 and additional information 106 in the original digital input image 101 by means of an electronic watermarking method, and outputs a watermarked image 110. The storage means 212 stores the watermarked image 110 therein, and outputs it to outside itself via a medium/external device 213.

As an alternative, before the electronic watermark is embedded in the original digital input image 101, the original digital input image 101 can be read out again after being stored in the storage means 212, and the information processing apparatus 10 which is the embedding side can embed the region management information 108 and additional information 106 in the original digital input image by means of the electronic watermarking method. Furthermore, the digital camera read the original digital input image 101 from the medium/external device 213 and write it in the storage means 212, and apply embedding using the electronic watermarking method to the original digital input image 101.

The medium in the medium/external device 213 is referred to as a semiconductor memory medium, a disk medium, or a card medium in which data can be recorded electrically, magnetically, or optically, and represents a mode in which data is written in or read out of the medium in order to exchange image data inside the storage means 212. The medium does not depend on characteristics such as read-only and rewritable. The external device in the medium/external device 213 represents a mode in which data is outputted and written in a medium or the like by cable or radio, or data is inputted and read out in order to exchange image data outside the storage means 212. The external device does not depend on a connection interface with the medium/external device 213.

As mentioned above, this embodiment 5 offers an advantage of being able to apply the information processing apparatus 10 in accordance with either of above-mentioned embodiments 1 to 4 which is the embedding side to the digital camera 210.

Embodiment 6

In this embodiment 6, a camera-equipped mobile phone or a PC in which the information processing apparatus 10 which is the embedding side and the information processing apparatus 20 which is the detection side, as explained in either of above-mentioned embodiments 1 to 4, are mounted will be explained.

Figure 24:
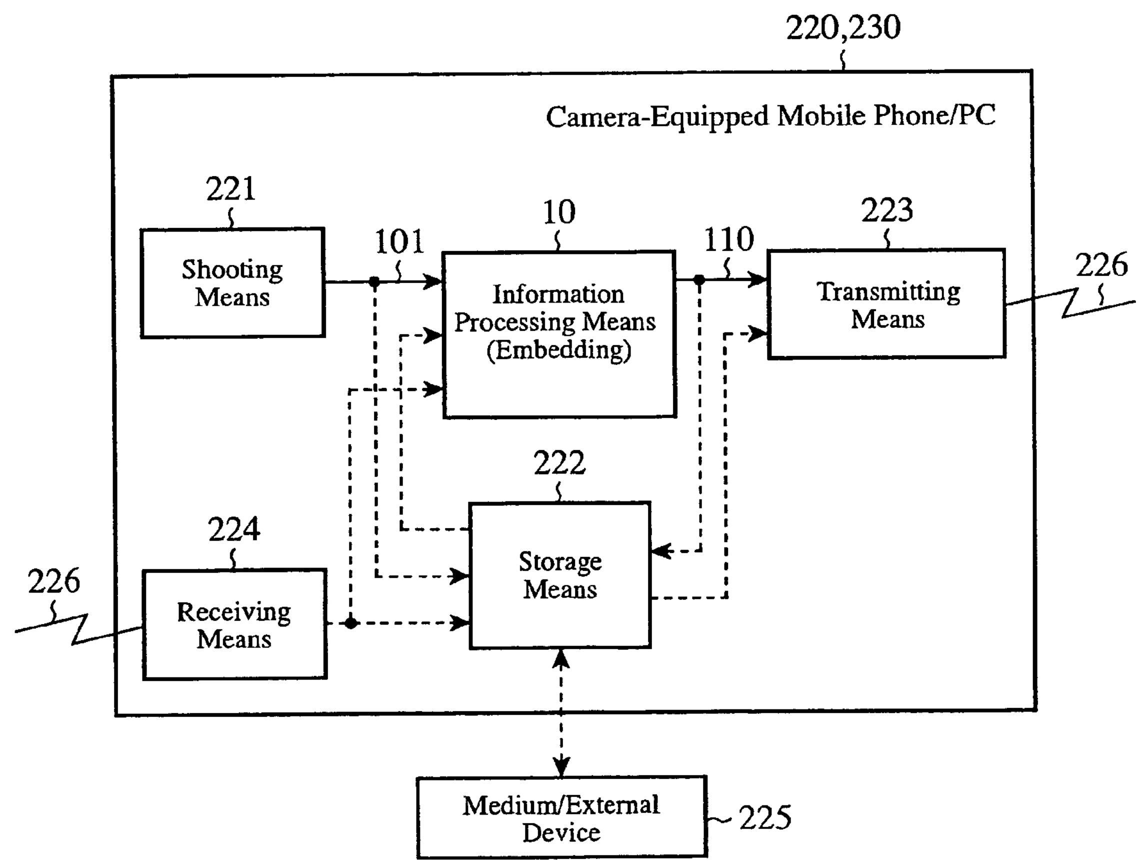
FIG. 24 is a block diagram showing the structure of a camera-equipped mobile phone or PC in accordance with embodiment 6 in which an information processing apparatus in accordance with the present invention which is an embedding side is mounted.

FIG. 24 is a block diagram showing the structure of the camera-equipped mobile phone 220 or PC 230 in accordance with embodiment 6 in which the mounted information processing apparatus 10 which is the embedding side in accordance with the present invention is mounted. This camera-equipped mobile phone 220 or PC 230 is provided with an imaging means 221, the information processing apparatus 10 which is the embedding side, a storage means 222, a transmitting means 223, and a receiving means 224.

Next, the operation of the camera-equipped mobile phone 220 or PC 230 shown in FIG. 24 will be explained.

The imaging means 221 shoots an object to be shot to produce an image, and outputs it as an original digital input image 101. As explained in either of above-mentioned embodiments 1 to 4, the information processing apparatus 10 which is the embedding side embeds region management information 108 and additional information 106 in the original digital input image 101 by means of an electronic watermarking method, and outputs a watermarked image 110. The transmitting means 223 sends out the watermarked image 110 to outside the camera-equipped mobile phone or PC through communications 226.

Before the region management information and additional information are embedded in the original digital input image 101 by means of the electronic watermarking method, the original digital input image 101 can be read out again after being stored in the storage means 222, and the region management information and additional information can be embedded in the original digital input image by means of the electronic watermarking method. As an alternative, the original digital input image 101 is retrieved from outside the camera-equipped mobile phone or PC by the receiving means 224 through the communications 226 and is then stored in the storage means 222, and, after that, the region management information and additional information can be embedded in the original digital input image by means of the electronic watermarking method. The original digital input image retrieved from outside the camera-equipped mobile phone or PC by the receiving means 224 can be alternatively subjected to the embedding of the region management information and additional information therein by means of the electronic watermarking method without being stored in the storage means. As an alternative, the original digital input image 101 can be inputted directly to the camera-equipped mobile phone or PC from a medium/external device 225 via the storage means 222.

The watermarked image 110 can be alternatively stored in the storage means 222 before being transmitted to outside the camera-equipped mobile phone or PC, and can be read again and transmitted to outside the camera-equipped mobile phone or PC. As an alternative, the watermarked image 110 can be transmitted directly to outside the camera-equipped mobile phone or PC from the medium/external device 225.

The communications 226 represent communications by cable or by radio, and do not depend upon the modulating method, amplitudes, wavelengths, difference between analog and digital, etc. Furthermore, the communications 226 do not depend upon the type of a network via which the communications are carried out, such as a private network or wide area network, like the Internet, a temporary connection or constant connection network, or a dedicated network or public network.

Figure 25:
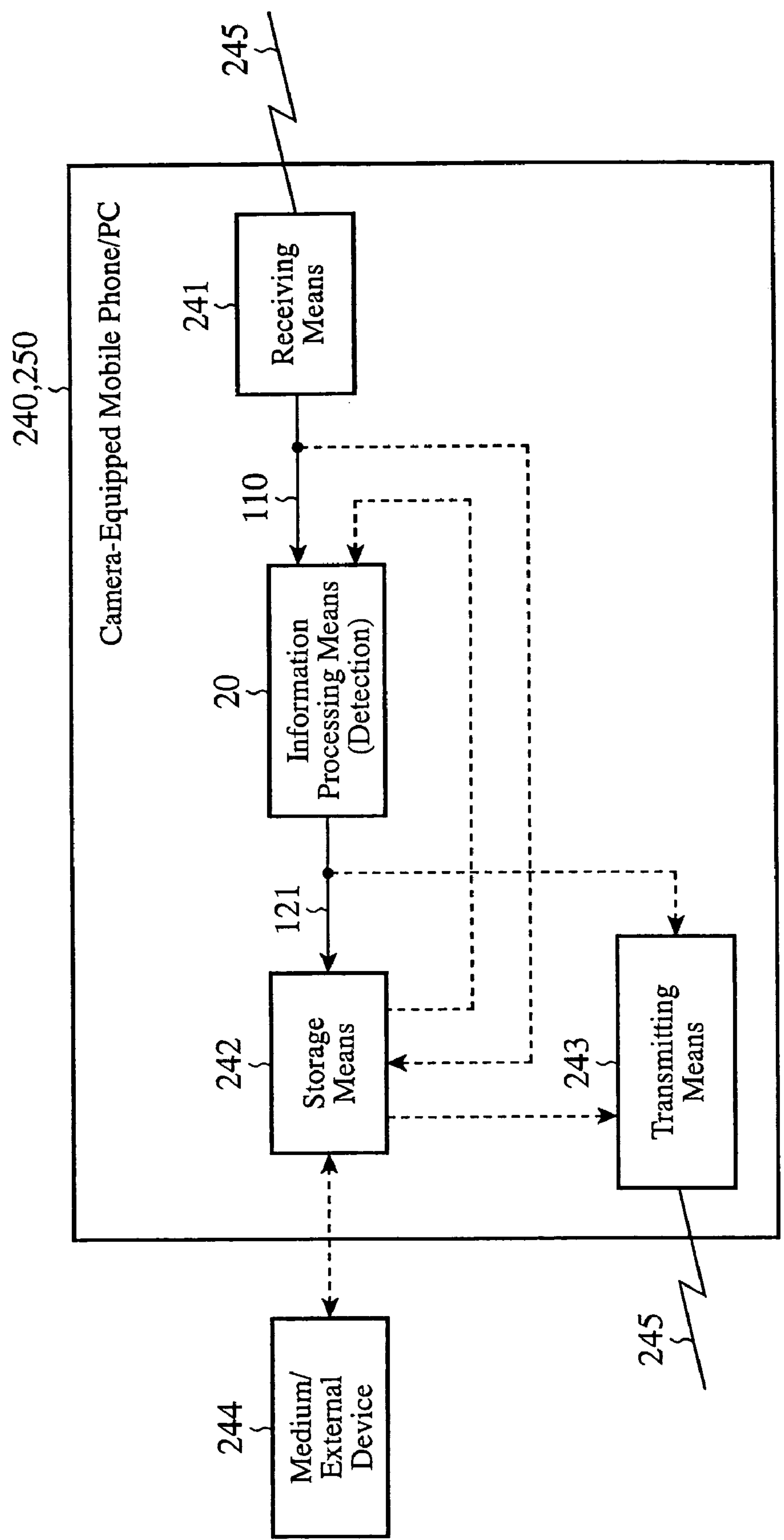
FIG. 25 is a block diagram showing the structure of a camera-equipped mobile phone or PC in accordance with embodiment 6 in which an information processing apparatus in accordance with the present invention which is a detection side is mounted.

FIG. 25 is a block diagram showing the structure of the camera-equipped mobile phone 240 or PC 250 in accordance with embodiment 6 in which the information processing apparatus 20 which is the detection side in accordance with the present invention is mounted. This camera-equipped mobile phone 240 or PC 250 is provided with a receiving means 241, the information processing apparatus 20 which is the detection side, a storage means 242, and a transmitting means 243.

Next, the operation of the camera-equipped mobile phone 240 or PC 250 shown in FIG. 25 will be explained.

The receiving means 241 retrieves a watermarked image 110 from outside the camera-equipped mobile phone or PC through communications 245. As explained in above-mentioned embodiments 1 to 4, the information processing apparatus 20 which is the detection side detects region management information 108 and additional information 106 from the watermarked image 110 by means of an electronic watermarking method, and outputs a digitized output image 121. The storage means 242 stores the digitized output image 121 therein, and outputs it to outside the camera-equipped mobile phone or PC via a medium/external device 244.

As an alternative, the watermarked image 110 can be stored in the storage means 242 before the region management information 108 and additional information 106 are detected from the watermarked image by means of the electronic watermarking method, and, after that, the watermarked image 110 can be read again and the region management information and additional information can be detected from the watermarked image by means of the electronic watermarking method. Alternatively, after the watermarked image 110 is inputted directly to the camera-equipped mobile phone or PC from the medium/external device 244 via the storage means 242, the region management information 108 and additional information 106 can be detected from the watermarked image by means of the electronic watermarking method.

Furthermore, the digitized output image 121 can be alternatively transmitted to outside the camera-equipped mobile phone or PC by the transmitting means 243, just as it is, through the communications 245. As an alternative, after the digitized output image is stored in the storage means 242 before being transmitted, the digitized output image can be read again and transmitted to outside the camera-equipped mobile phone or PC.

As mentioned above, this embodiment 6 offers an advantage of being able to apply the information processing apparatus 10 which is the embedding side and information processing apparatus 20 which is the detection side in accordance with either of above-mentioned embodiments 1 to 4 to the camera-equipped mobile phone 220 or PC 230, and the camera-equipped mobile phone 240 or PC 250, respectively.

Embodiment 7

In this embodiment 7, a printer in which the information processing apparatus 20 which is the detection side as explained in either of above-mentioned embodiments 1 to 4 is mounted will be explained.

Figure 26:
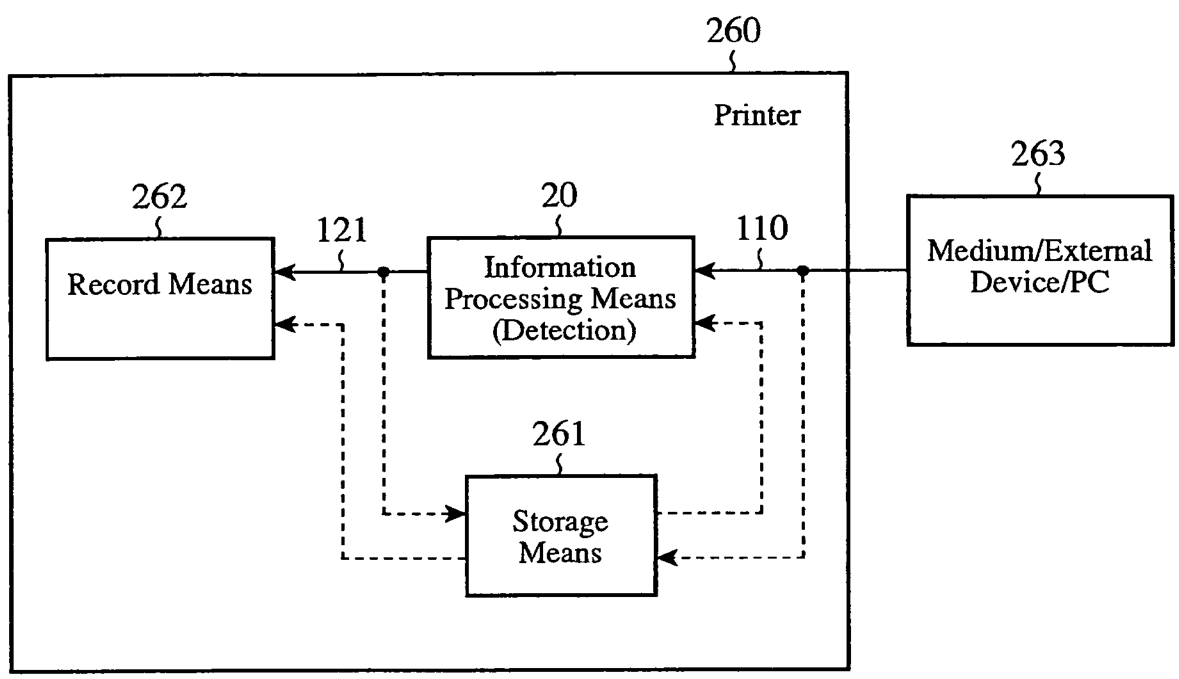
FIG. 26 is a block diagram showing the structure of a printer in accordance with embodiment 7 in which an information processing apparatus in accordance with the present invention which is a detection side is mounted.

FIG. 26 is a block diagram showing the structure of the printer 260 in accordance with embodiment 7 in which the information processing apparatus 20 which is the detection side in accordance with the present invention is mounted. This printer 260 is provided with the information processing apparatus 20 which is the detection side, a storage means 261, and a recording means 262.

Next, the operation of the printer in accordance with this embodiment of the present invention will be explained.

The information processing apparatus 20 which is the detection side detects region management information 108 and additional information 106 from a watermarked image 110 inputted thereto from outside the printer via a medium/external device or PC 263 by means of an electronic watermarking method, and outputs a digitized output image 121, as explained in above-mentioned embodiments 1 to 4. The recording means 262 outputs the digitized output image 121 as shown in FIG. 9 after incorporating a display of related information on a point of interest into the digitized output image.

As an alternative, the watermarked image 110 can be stored in the storage means 261 before the region management information 108 and additional information 106 are detected from the watermarked image by means of the electronic watermarking method, and, after that, the watermarked image 110 can be read again and the region management information and additional information can be detected from the watermarked image by means of the electronic watermarking method. Furthermore, the digitized output image 121 can be stored in the storage means 261 before related information is recorded therein by the recording means 262, and, after that, can be read again and then related information can be recorded in the read digitized output image.

As mentioned above, this embodiment 7 offers an advantage of being able to apply the information processing apparatus 20 which is the detection side in accordance with either of above-mentioned embodiments 1 to 4 to the printer 260.

The digital camera 210, camera-equipped mobile phone 220 or 240 or PC 230 or 250, and printer 260 are examples of the application of the information processing apparatus shown in above-mentioned embodiments 5 to 7. The information processing apparatus shown in above-mentioned embodiments 5 to 7 can be also applied to other applications having the same structures as the digital camera, camera-equipped mobile phone or PC, and printer, respectively. For example, in the structure shown in FIG. 26 of above-mentioned embodiment 7, in a case in which a scanner is connected, as an imaging means, to the printer via the medium/external device or PC 263, a facsimile apparatus can be implemented with the same structure.

In each of those applications mentioned above, not only the functions of the information processing apparatus in accordance with the present invention can be incorporated, as hardware, into an existing device, but also software (plug-in or add-in software) can be read and incorporated into the existing device via a medium or communications. In this variant, the functionality of the existing device can be extended additionally and the software version can be upgraded to the latest version. Furthermore, the existing device itself whose functionality can be extended through the reading of software can be software.

INDUSTRIAL APPLICABILITY

As mentioned above, the information processing apparatus and the information processing method in accordance with the present invention refers to an amount of additional information and allocates an embedding region when embedding additional information on each point of interest in an image by means of an electronic watermarking method, and are suitable for use in a digital camera, a camera-equipped mobile phone, a PC, a printer, and so on.

The invention claimed is:

1. An information processing apparatus comprising:

an image display means for displaying an original digital input image, and for outputting information on a size of the image;

a point of interest specifying means for specifying a point of interest in the original digital input image currently displayed on a basis of an inputted instruction;

a related information output means for inputting related information on said point of interest, and for outputting a text of the related information;

an additional information conversion means for converting the text of said related information to additional information and outputting this additional information, and for outputting an amount of the additional information on said each point of interest;

an embedding region allocating means for outputting region management information including said amount of additional information, for allocating an embedding region for said additional information in said original digital input image on a basis of said image size information and said amount of the additional information, and for outputting information on said embedding region as region information; and an embedding information means for embedding said region management information in a predetermined region in said original digital input image, and also embedding said additional information in said original digital input image on a basis of said region information to generate and output an watermarked image.

2. The information processing apparatus according to claim 1, characterized in that said point of interest specifying means outputs coordinate information on the specified point of interest, and said embedding region allocating means outputs said region management information after incorporating said coordinate information on the specified point of interest into said region management information.

3. The information processing apparatus according to claim 1, characterized in that said point of interest specifying means outputs coordinate information on the specified point of interest, and said additional information conversion means outputs said additional information after incorporating said coordinate information on the specified point of interest into said additional information.

4. The information processing apparatus according to claim 1, characterized in that said point of interest specifying means outputs mark information on the specified point of interest, and said additional information conversion means outputs said additional information after incorporating said mark information on the specified point of interest into said additional information.

5. The information processing apparatus according to claim 1, characterized in that said information processing apparatus includes a related information adjustment means for outputting an amount of remaining additional information which can be additionally embedded on a basis of said image size information and said amount of additional information, and said related information input means inputs the related information on a basis of said amount of remaining additional information.

6. The information processing apparatus according to claim 1, characterized in that said point of interest specifying means outputs coordinate information on the specified point of interest, said related information input means outputs a number of characters included in the text of the inputted related information, and characterized in that said information processing apparatus includes a display position determining means for determining a display position at which said related information is to be displayed in said original digital input image so that said related information does not overlap the point of interest to be displayed on a basis of said coordinate information on the specified point of interest and said number of characters included in the text of the inputted related information, and said additional information conversion means outputs said additional information after incorporating said display position information into said additional information.

7. The information processing apparatus according to claim 6, characterized in that said point of interest specifying means outputs mark information on the specified point of interest, and said display position determining means determines said display position in consideration of said mark information on the specified point of interest.

8. An information processing apparatus comprising:

an information detection means for detecting and outputting region management information from a predetermined region of a watermarked image in which additional information including a text of related information on a point of interest and region management information including an amount of additional information for said each point of interest are embedded, for detecting and outputting said additional information from said watermarked image on a basis of region information mentioned below, and for outputting a digitized output image from said watermarked image;

an image display means for displaying said digitized output image, and for outputting image size information on a size of said digitized output image;

an embedding region allocating means for allocating an embedding region for said additional information in said digitized output image on a basis of said image size information and an amount of additional information included in said region management information, and for outputting information on said embedding region as region information;

an additional information reverse conversion means for carrying out reverse conversion of the additional information detected by said information detection means, and for outputting the text of the related information on the point of interest;

a point of interest display means for displaying a point of interest which is specified in said digitized output image on a basis of coordinate information on the specified point of interest included in either said region management information or said additional information;

a related information display means for inputting the text of the related information on said point of interest, for outputting a number of characters included in said text, and for displaying the related information in said digitized output image on a basis of display position information mentioned below; and a display position determining means for determining a display position at which the related information is to be displayed in the original digital input image so that said related information does not overlap the point of interest to be displayed on a basis of the coordinate information on said point of interest and said number of characters included in the text of the related information.

9. The information processing apparatus according to claim 8, characterized in that said point of interest display means displays the point of interest on a basis of mark information included in said additional information, and said display position determining means determines a position of display of the related information in consideration of said mark information.

10. The information processing apparatus according to claim 8, characterized in that said information detection means detects said region management information, and releases said region management information from said watermarked image after outputting said region management information.

11. The information processing apparatus according to claim 8, characterized in that said information detection means detects said additional information, and releases said additional information after outputting said watermarked image.

12. An information processing apparatus comprising:

an information detection means for detecting and outputting region management information from a predetermined region of a watermarked image in which additional information including a text of related information on a point of interest and region management information including an amount of additional information for said each point of interest are embedded, for detecting and outputting said additional information from said watermarked image on a basis of region information mentioned below, and for outputting a digitized output image from said watermarked image;

an image display means for displaying said digitized output image, and for outputting image size information on a size of said digitized output image;

an embedding region allocating means for allocating an embedding region for said additional information in said digitized output image on a basis of said image size information and an amount of additional information included in said region management information, and for outputting information on said embedding region as region information;

an additional information reverse conversion means for carrying out reverse conversion of the additional information detected by said information detection means, and for outputting the text of the related information on a point of interest and display position information indicating a position of display of said related information at which it does not overlap the point of interest to be displayed;

a related information display means for displaying the specified point of interest in said digitized output image on a basis of coordinate information on the point of interest included in either said region management information or said additional information; and a related information display means for inputting the text of the related information on said point of interest, and for displaying the related information in said digitized output image on a basis of said display position information.

13. The information processing apparatus according to claim 12, characterized in that said point of interest display means displays the point of interest on a basis of mark information included in said additional information.

14. An information processing method comprising the steps of:

displaying an original digital input image, and outputting information on a size of the image;

specifying a point of interest in the original digital input image currently displayed on a basis of an inputted instruction;

inputting related information on said point of interest, and outputting a text of the related information;

converting the text of said related information into additional information and outputting this additional information, and outputting an amount of the additional information on said each point of interest;

outputting region management information including said amount of additional information, allocating an embedding region for said additional information in said original digital input image on a basis of said image size information and said amount of the additional information, and outputting information on said embedding region as region information; and embedding said region management information in a predetermined region in said original digital input image, and also embedding said additional information in said original digital input image on a basis of said region information to generate and output a watermarked image.

15. An information processing method comprising the steps of:

detecting and outputting region management information from a predetermined region of a watermarked image in which additional information including a text of related information on a point of interest and region management information including an amount of additional information for said each point of interest are embedded;

outputting a digitized output image from said watermarked image;

displaying said digitized output image, and outputting image size information on a size of said digitized output image;

allocating an embedding region for said additional information in said digitized output image on a basis of said image size information and an amount of additional information included in said region management information, and outputting information on said embedding region as region information;

detecting and outputting the additional information from said watermarked image on a basis of said region information;

carrying out reverse conversion of said detected additional information, and outputting the text of the related information on the point of interest;

displaying a point of interest which is specified in said digitized output image on a basis of coordinate information on the point of interest included in either said region management information or said additional information;

inputting the text of the related information on said point of interest, and outputting a number of characters included in said text;

determining a display position at which the related information is to be displayed in the original digital input image so that said related information does not overlap the point of interest to be displayed on a basis of the coordinate information on said point of interest and said number of characters included in the text of the related information, and outputting the display position information; and inputting the text of said related information, and displaying the related information in said digitized output image on a basis of said display position information.

16. An information processing method comprising the steps of:

detecting and outputting region management information from a predetermined region of a watermarked image in which additional information including a text of related information on a point of interest and region management information including an amount of additional information for said each point of interest are embedded;

outputting a digitized output image from said watermarked image;

displaying said digitized output image, and outputting image size information on a size of said digitized output image;

allocating an embedding region for said additional information in said digitized output image on a basis of said image size information and an amount of additional information included in said region management information, and outputting information on said embedding region as region information;

detecting and outputting the additional information from said watermarked image on a basis of said region information; carrying out reverse conversion of said detected additional information, and outputting the text of the related information on a point of interest and display position information indicating a position of display of said related information at which it does not overlap the point of interest to be displayed;

displaying the specified point of interest in said digitized output image on a basis of coordinate information on the point of interest included in either said region management information or said additional information; and inputting the text of said related information, and displaying the related information in said digitized output image on a basis of said display position information.

* * * * *